US010193798B2

(12) United States Patent
Roeland et al.

(10) Patent No.: US 10,193,798 B2
(45) Date of Patent: Jan. 29, 2019

(54) METHODS AND MODULES FOR MANAGING PACKETS IN A SOFTWARE DEFINED NETWORK

(71) Applicant: Telefonaktiebolaget LM Ericsson (publ), Stockholm (SE)

(72) Inventors: Dinand Roeland, Sollentuna (SE); Calin Curescu, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/542,133

(22) PCT Filed: Nov. 11, 2015

(86) PCT No.: PCT/SE2015/051196
§ 371 (c)(1),
(2) Date: Jul. 7, 2017

(87) PCT Pub. No.: WO2016/114701
PCT Pub. Date: Jul. 21, 2016

(65) Prior Publication Data
US 2018/0262424 A1    Sep. 13, 2018

Related U.S. Application Data

(60) Provisional application No. 62/102,127, filed on Jan. 12, 2015.

(51) Int. Cl.
*H04W 24/02* (2009.01)
*H04L 12/24* (2006.01)
(Continued)

(52) U.S. Cl.
CPC .......... *H04L 45/38* (2013.01); *H04L 12/4633* (2013.01); *H04L 41/0803* (2013.01); *H04L 45/64* (2013.01); *H04W 40/02* (2013.01)

(58) Field of Classification Search
CPC ..... H04L 45/38; H04L 45/64; H04L 12/4633; H04L 41/0803; H04L 41/0873;
(Continued)

(56) References Cited

U.S. PATENT DOCUMENTS 7,126,941 B1 *  10/2006  Clemm ............... H04L 41/0806
                                                               370/352
9,276,877 B1 *   3/2016  Chua ....................... H04L 45/02
(Continued)

FOREIGN PATENT DOCUMENTS

CN    104579810 A    4/2015
RU    2530279 C1    10/2014
(Continued)

OTHER PUBLICATIONS

3GPP, "3rd Generation Partnership Project; Technical Specification Group Services and System Aspects; Architecture enhancements for non-3GPP accesses (Release 13)", 3GPP TS 23.402 V13.0.0, Dec. 2014, 1-290.
(Continued)

*Primary Examiner* — Afsar M Qureshi
(74) *Attorney, Agent, or Firm* — Murphy, Bilak & Homiller, PLLC

(57) ABSTRACT

Methods, an uplink module (130), downlink module (160), an entry module (170) and a management module (147) for managing packets in a communication system (100) based on Software Defined Networking are disclosed. A data plane of the communication system (100) comprises a forwarding module (140), a service module (145) and the entry module (170) and a control plane of the communication system (100) comprises the management module (147). The entry module (170) receives (8) an Internet Protocol "IP" packet from the peer device (180), wherein the IP packet includes a destination IP address associated with the mobile device
(Continued)

(120). The entry module (170) obtains (9), from the management module (147), a location value specifying the radio network node (110) associated with the destination IP address. The entry module (170) associates (10) the location value with the IP packet, wherein the location value is related to a location tag name, indicating the radio network node (110) that serves the mobile device (120), thereby obtaining a packet. The entry module (170) sends (11) the packet, via the forwarding module (140), towards the radio network node (110) as indicated by the location value of the location tag name. Corresponding computer programs and carriers therefor are also disclosed.

30 Claims, 20 Drawing Sheets

(51) Int. Cl.
*H04L 12/46* (2006.01)
*H04W 40/02* (2009.01)
*H04L 12/715* (2013.01)
*H04L 12/721* (2013.01)

(58) Field of Classification Search
CPC ..... H04L 41/22; H04L 47/2408; H04L 69/22; H04W 40/02; H04W 24/02
See application file for complete search history.

(56) References Cited

U.S. PATENT DOCUMENTS

| 2010/0085903 | A1* | 4/2010 | Pandey | H04L 12/10 |
| | | | | 370/311 |
| 2011/0134915 | A1* | 6/2011 | Srinivasan | G06F 13/28 |
| | | | | 370/389 |
| 2014/0195559 | A1* | 7/2014 | Ko | H04L 67/12 |
| | | | | 707/770 |
| 2014/0282628 | A1* | 9/2014 | Pruss | G06F 9/54 |
| | | | | 719/328 |
| 2015/0003455 | A1 | 1/2015 | Haddad et al. | |
| 2015/0296445 | A1* | 10/2015 | Zhou | H04W 48/16 |
| | | | | 370/328 |

FOREIGN PATENT DOCUMENTS

| WO | 2015000386 A1 | 1/2015 |
| WO | 2015009939 A1 | 1/2015 |
| WO | 2015024527 A1 | 2/2015 |

OTHER PUBLICATIONS

3GPP, "3rd Generation Partnership Project; Technical Specification Group Services and System Aspects; General Packet Radio Service (GPRS) enhancements for Evolved Universal Terrestrial Radio Access Network (E-UTRAN) access (Release 13)", 3GPP TS 23.401 V13.1.0, Dec. 2014, 1-310.
Jin, Xin et al., "SoftCell: Taking Control of Cellular Core Networks", May 15, 2013, 1-14.
Kreutz, Diego et al., "Software-Defined Networking: A Comprehensive Survey", Proceedings of the IEEE, vol. 103, No. 1, Jan. 2015, 14-76.
Kuklinski, Siawomir et al., "Handover Management in SDN-based Mobile Networks", IEEE 6th International Workshop on Management of Emerging Networks and Services, 2014, 194-200.

* cited by examiner

"New" Packet including header that comprises one or more tags and values as described in the application text

METHODS AND MODULES FOR MANAGING PACKETS IN A SOFTWARE DEFINED NETWORK

TECHNICAL FIELD

Embodiments herein relate to communication systems, such as wireless communication systems. In particular, methods and modules for managing packets in a communication system based on Software Defined Networking are disclosed.

BACKGROUND

Today's mobile network architecture, a so called Evolved Packet Core (EPC) architecture, is described in Third Generation Partnership Project (3GPP) Technical Specification (TS) 23.401 and 3GPP TS 23.402. An overview of the EPC architecture 100 is illustrated in FIG. 1. An user equipment (UE) 101 (or mobile device) attaches to a network, e.g. via a radio access network such as evolved-UMTS Terrestrial Radio Access Network (UTRAN) 102, where UMTS stands for Universal Mobile Telecommunications System, and receives an Internet Protocol (IP) address. The UE uses that IP address to communicate with peers on a Packet Data Network (PDN) 103. Such PDN is in most cases the Internet, but could also be an operator's IP service like IP Multimedia Subsystem (IMS), Public-switched telephone network Simulation Subsystem (PSS) or the like. The PGW (PDN Gateway) 104 provides access towards one or more PDNs 103. There is a logical IP tunnel, called PDN connection, between UE and PGW.

All traffic of a PDN connection is routed through one and the same PGW 104. The IP address of that PDN connection, i.e. the UE's IP address, topologically belongs to the PGW 104. The PGW 104 thus acts as an anchor point for that IP address. Wherever the UE 101 moves, the anchor point remains the same. This way the peer on Internet, such as the PDN 103, does not notice the movement of the UE 101.

A PDN connection consists of three segments: the segment between UE and Base Station (BS), in FIG. 1 denoted as E-UTRAN 102, the segment between the BS 102 and SGW (Serving Gateway) 105, and the segment between the SGW 105 and the PGW 104. The latter two are implemented by General Packet Radio Service (GPRS) Tunnelling Protocol (GTP) tunneling (http://en.wikipedia.org/wiki/GPRS_Tunnelling_Protocol). E.g. a downstream IP user data packet (i.e. a packet towards the UE) between the PGW 104 and the SGW 105 is encapsulated in a GTP header and an outer IP transport header. The GTP header contains a Tunnel Endpoint ID (TEID) indicating which user, i.e. which UE 101, this packet belongs to. The outer IP transport header has the SGW 105 has destination address. There is a similar setup between the SGW 105 and the BS 102, but there a downlink packet has the BS address set as destination address in the transport IP header.

FIG. 1 illustrates further entities, such as Mobility Management Entity (MME) 106, Home Subscription System (HSS) 107, Serving GPRS Support Node (SGSN) 108, Policy and Charging Rules Function (PCRF) 109 for completeness. Moreover, two other exemplifying radio access networks, i.e. UTRAN 110 and GSM EDGE Radio Access Network (GERAN) 111, where GSM denotes Global System for mobile communication and EDGE denotes Enhanced Data Rates for GSM Evolution, are shown.

On transport level there may be additional layers, not shown in FIG. 1. E.g. the BS 102 and the SGW 105 may be in different sites, and the transport of packets between the sites may be performed through an encrypted transport tunnel. In such a setup, there may be a security gateway on both ends of the transport tunnel performing the encryption and decryption.

In order to fulfill upcoming requirements on the EPC architecture 100, it is believed that a completely redesigned architecture is required.

One such redesigned architecture is proposed to be based on Software Defined Networking (SDN). With software defined networking, a so called control plane is separated from a so called user plane, or data plane. A vision is that such architecture leads to a cheaper and more flexible network deployment. Networking services, such as network address translation, deep packet inspection, access control and the like, are no longer provided as monolithic boxes, but split up into the user plane performing the forwarding of user plane packets, and the control plane instructing the user plane how to perform the forwarding. A route, or path, that packets of a specific user, or even a specific flow of a user, takes through a collection of user plane forwarding elements is also known as a service chain.

Service chaining is today mainly used in a context where the end device does not move from a service chaining perspective. Typically, this is a fixed network environment or a mobile network where service chaining is used only above an anchor point.

In a service chaining environment where the end device does move, as would be the case when SDN is used in the above mentioned redesigned core architecture for a mobile wireless communication system, some new requirements are placed on the forwarding of the packets of that device. In particular, packets may get forwarded by a different set of forwarding elements after the moving. This implies that some kind of reconfiguration is needed in order to forward the packets of that device to the new location of that device.

Consider the network example in FIG. 2, in which a device, i.e. a UE such as a UEa 201 in the Figure, moves from a source base station (BS1) 202 to a target base station (BS3) 204. There are four base stations 202-205 and a number of Forwarding Elements (FEs), i.e. FE1 206 though FE7 212. The Forwarding Elements FE1-FE7 206-212 may be organized in this way for topological reasons; i.e. a first Forwarding Element (FE1) 206 may be close to the source base station (BS1) 202 but far from the target base station (BS3) 204.

Let's assume that the UEa 201 communicates with a peer 213, such as a computer, another UE, a server or the like, behind a further Forwarding Element (FE7) 212. In a naive implementation, each Forwarding Element in the UE-peer chain (of Forwarding Elements: FE1 206-FE2 207-FE5 210-FE6 211-FE7 212) will have at least one entry for the UEa 201. Worst case, there may be a single entry for every flow of the UEa 201. Now assume that the UEa 201 moves from the BS1 202 to the BS3 204. This would require new entries for the UEa 201 in a third Forwarding Element (FE3) 208 and a fourth Forwarding Element (FE4) 209. It would also require an update to the UEa 201 entries in a fifth Forwarding Element (FE5) 210, such that packets towards the UEa 201 are now forwarded to the FE4 209 instead of to a second Forwarding Element (FE2) 207. And finally, the entries of the UEa 201 in a first Forwarding Element (FE1) 202 and the FE 2 207 would need to be removed. All this causes a lot of control plane signaling towards the Forwarding Elements and node(s) controlling the Forwarding Elements. This is not a scalable solution.

SoftCell (ftp://ftp.cs.princeton.edu/techreports 2013/950. proposes one solution to this scalability problem. FIG. 3 is used to explain how the aspect of mobility with service chaining is solved in the SoftCell approach.

SoftCell defines an Access Switch (AS), such as AS1 320, AS2 321, AS3 322 and AS4 324 in FIG. 3, that are close to base stations, such as a source base station (BS1) 310. The Access Switch is logically located between the base stations and first Forwarding Elements, such as FE1 340 and FE3 342. The AS could be co-located with the BS, and could in fact be the first Forwarding Elements, again such as FE 1 340 and FE3 2 combined with a User Plane Function (UPF). In this terminology, the Forwarding Element performs solely the packet forwarding and the UPF performs some kind of operation on the packet and may even alter the packet. Combined they may perform one of the network services mentioned above.

The AS performs packet classification on traffic of UEs. Each packet is mapped to a policy. The policy defines which chain that packet belong to; i.e. which FEs and UPFs that packet needs to traverse. Packets are then aggregated onto three dimensions: policy, location (a base station ID) and UE ID. These aggregation dimensions can then selectively be used thereby limiting the number of entries in the FEs. E.g., FE5 344 in the figure above can base its downlink forwarding decisions on the location dimension, and does not need to take the UE dimension into account. FE 345 can base its uplink forwarding decision on the policy dimension, and does not need to take into account the location and UE dimension.

SoftCell proposes to code the three dimensions of policy, base station ID and UE ID in the source IP address and port of uplink packets. It is the AS that does this encoding. So the AS translates the source IP address and port used by the UE into a new source IP address and port, similar to a Network Address Translation (NAT) function. Between AS and peer this new IP address and port pair is used. The downlink packet from the peer includes new IP address and port as destination address. As the IP address topologically belongs to the AS, the downlink packet will arrive at the same AS. The AS then translates back to the original IP address and port known by the UE.

Now assume that a device, such as a UEa 301, moves from the BS1 310 to the BS2 311 in FIG. 3. The UEa 301 would thus move from a first Access Switch (AS1) 320 to a second Access Switch (AS2) 321. SoftCell proposes to keep existing flows routed via the AS1 320, in order to avoid a perceived IP address change for ongoing flows. So, for a flow that started when the UEa 301 was still on the BS1 310, the flow gets routed via the BS2 311 and the AS1 320 after the move. Only new flows get routed via the BS2 311 and the AS 2 321.

The SoftCell approach has a couple of disadvantages:

The encoding of the three dimensions into an IP address and port pair only works for flows that originate from the UEa 301. Because the peer is not aware of any encoding scheme, the SoftCell approach does not work for flows that originate from the peer.

After the UEa 301 has moved to a new BS, such as the BS2 311, existing flows are still routed via the AS1 320 associated with the old BS, i.e. the BS1 310. This introduces sub-optimal routing of such flows. This is in particular a disadvantage for long-lasting flows.

Assume that the UEa 301 has a number of active flows towards a peer. It then moves to a new BS, such as the BS2 311, and starts an additional flow. Then the peer 350 will perceive a new source address for the additional flow, even though that flow originates from the same UEa 301. This may confuse the peer 350 in certain scenarios.

SoftCell is basically introducing a Network Address Translation (NAT). This is acceptable for IPv4, as there already are so many NATs employed for IPv4 anyway, but is less appealing for IPv6.

Another solution is needed that removes these limitations from SoftCell, while at the same time keeping the advantages of SoftCell; i.e. scalable signaling towards the Forwarding Elements by aggregating flows.

SUMMARY

An object may be to improve performance of the above mentioned communication system, such as a communication system utilizing Software Defined Networking.

According to an aspect, the object is achieved by a method, performed by an entry module, for managing packets in a communication system based on Software Defined Networking, wherein the communication system comprises the entry module, a radio network node, a mobile device, a forwarding module, a service module, a peer device and a management module for managing the forwarding module, the service module and the entry module, wherein a data plane of the communication system comprises the forwarding module, the service module and the entry module and a control plane of the communication system comprises the management module, wherein the mobile device is attached to the radio network node. The entry module receives an IP packet from the peer device, wherein the IP packet includes a destination IP address associated with the mobile device. The entry module obtains, from the management module, a location value specifying the radio network node associated with the destination IP address. The entry module associates the location value with the IP packet, wherein the location value is related to a location tag name, indicating the radio network node that serves the mobile device, thereby obtaining a packet. Furthermore, the entry module sends the packet, via the forwarding module, towards the radio network node as indicated by the location value of the location tag name.

According to another aspect, the object is achieved by an entry module configured to manage packets in a communication system based on Software Defined Networking, wherein the communication system comprises the entry module, a radio network node, a mobile device, a forwarding module, a service module, a peer device and a management module for managing the forwarding module, the service module and the entry module, wherein a data plane of the communication system comprises the forwarding module, the service module and the entry module and a control plane of the communication system comprises the management module, wherein the mobile device is attached to the radio network node, wherein the entry module is configured for: receiving an IP packet from the peer device, wherein the IP packet includes a destination IP address associated with the mobile device; obtaining, from the management module, a location value specifying the radio network node associated with the destination IP address; associating the location value with the IP packet, wherein the location value is related to a location tag name, indicating the radio network node that serves the mobile device, thereby obtaining a packet; and sending the packet, via the forwarding module, towards the radio network node as indicated by the location value of the location tag name.

According to a further aspect, the object is achieved by a method, performed by a downlink module, for managing packets in a communication system based on Software Defined Networking, wherein the communication system comprises the downlink module, a radio network node, a mobile device, a forwarding module, a service module, a peer device and a management module for managing the forwarding module and the service module, wherein a data plane of the communication system comprises the downlink module, the forwarding module and the service module and a control plane of the communication system comprises the management module, wherein the mobile device is attached to the radio network node. The downlink module receives, from the management module, second configuration information indicating a treatment tag name, and treatment values. The downlink module receives, via the entry module, a packet from the peer device. The downlink module selects a treatment value out of the treatment values based on information included in the packet, thereby classifying the packet. The downlink module associates the treatment value with the packet, wherein the treatment value is related to the treatment tag name. The downlink module sends the packet and the associated treatment value, via the forwarding module which performs the treatment of the packet according to the treatment value, towards the radio network node.

According to yet another aspect, the object is achieved by a downlink module configured to manage packets in a communication system based on Software Defined Networking, wherein the communication system comprises the downlink module, a radio network node, a mobile device, a forwarding module, a service module, a peer device and a management module for managing the forwarding module and the service module, wherein a data plane of the communication system comprises the downlink module, the forwarding module and the service module and a control plane of the communication system comprises the management module, wherein the mobile device is attached to the radio network node, wherein the downlink module is configured for: receiving, from the management module, second configuration information indicating a treatment tag name, and treatment values, performed by the forwarding module, of the packets; receiving, via the entry module, a packet from the peer device; selecting a treatment value out of the treatment values based on information included in the packet, thereby classifying the packet; associating the treatment value with the packet, wherein the treatment value is related to the treatment tag name; and sending the packet and the associated treatment value, via the forwarding module which performs the treatment of the downlink classified packet according to the treatment value, towards the radio network node.

According to a still further aspect, the object is achieved by a method, performed by a management module, for managing configuration information in a communication system based on Software Defined Networking, wherein the communication system comprises an entry module, a downlink module, a forwarding module, and an uplink module, wherein a data plane of the communication system comprises the forwarding module and a control plane of the communication system comprises the management module. The management module generates first configuration information and/or second configuration information, wherein the first configuration information indicates a location tag name and location values, wherein each location value is associated to a respective radio network node to which the mobile device is capable of attaching, and/or the second configuration information indicates a treatment tag name and treatment values and a rule for treatment, performed by the forwarding module, of the packets. The management module sends the first configuration information to the entry module and/or sending the second configuration information to the downlink module and/or the uplink module.

According to yet a further aspect, the object is achieved by a management module configured to manage configuration information in a communication system based on Software Defined Networking, wherein the communication system comprises an entry module, a downlink module, a forwarding module, and an uplink module, wherein a data plane of the communication system comprises the forwarding module and a control plane of the communication system comprises the management module, wherein the management module is configured for: generating first configuration information and/or second configuration information, wherein the first configuration information indicates a location tag name and location values, wherein each location value is associated to a respective radio network node to which the mobile device is capable of attaching, and/or the second configuration information indicates a treatment tag name and treatment values and a rule for treatment, performed by the forwarding module, of the packets; and sending the first configuration information to the entry module and/or sending the second configuration information to the downlink module and/or the uplink module.

According to still another aspect, the object is achieved by a method, performed by an uplink module, for managing packets in a communication system based on Software Defined Networking, wherein the communication system comprises the uplink module, a radio network node, a mobile device, a forwarding module, a service module, a peer device and a management module for managing the forwarding module and the service module, wherein a data plane of the communication system comprises the uplink module, the forwarding module and the service module and a control plane of the communication system comprises the management module, wherein the mobile device is attached to the radio network node. The uplink module receives, from the management module, second configuration information indicating a treatment tag name, and treatment values. The uplink module receives, via the radio network node, an IP packet from the mobile device. The uplink module selects a treatment value out of the treatment values based on information included in the packet, thereby classifying the IP packet. The uplink module generates an uplink classified packet encapsulating the treatment value and the IP packet, wherein the treatment value is related to the treatment tag name. The uplink module sends the uplink classified packet, via the forwarding module which performs the treatment of the uplink classified packet according to the treatment value, towards the peer device.

According to a yet further aspect, the object is achieved by an uplink module configured for managing packets in a communication system based on Software Defined Networking, wherein the communication system comprises the uplink module, a radio network node, a mobile device, a forwarding module, a service module, a peer device and a management module for managing the forwarding module and the service module, wherein a data plane of the communication system comprises the uplink module, the forwarding module and the service module and a control plane of the communication system comprises the management module, wherein the mobile device is attached to the radio network node, wherein the uplink module is configured for: receiving, from the management module, second configuration information indicating a treatment tag name, and treatment values; receiving, via the radio network node, an IP packet from the mobile device; selecting a treatment value out of the treatment values based on information included in the packet, thereby classifying the IP packet; generating an uplink classified packet encapsulating the treatment value and the IP packet, wherein the treatment value is related to the treatment tag name; and sending the uplink classified packet, via the forwarding module which performs the treatment of the uplink classified packet according to the treatment value, towards the peer device.

According to further aspects, the object is achieved by computer programs and carriers for the computer programs corresponding to the aspects above.

Embodiments herein provide a scalable solution for mobility in combination with service chaining. The embodiments herein are applicable to a core network architecture, where the management module may handle a location registry that is kept up-to-date with the current location of each mobile device, i.e. user equipment, as described in the detailed description below. The location registry may be implemented in several ways, including in a distributed fashion, e.g. within a control plane.

With the embodiments herein, packets are marked, or associated, with one or more tags, where a tag has a tag name and a value. A combination of tags defines a path through a SDN, comprising the first and/or downlink modules, for that packet. Aggregation of entries, e.g. tag names, may be achieved by using the same tag for multiple flows and multiple devices, thereby limiting the number of entries in the forwarding elements of the service chain, aka route or path. Packets are tagged by one or more modules, such as the first and downlink modules.

At a mobility event, when the mobile device has moved to a new location, at least one entry module, and possibly also one or more downlink modules, gets updated such that packets for that device get marked with the same tag names, such as the location tag name, but where one or more tags have an updated value, i.e. the location value. The updated value reflects the new location of the mobile device, e.g. reflects the radio network node serving the mobile device at the new location.

Forwarding modules may be configured on how packets with a specific tag are to be forwarded. Most of this configuration, and in typical cases all configuration, does not need to be updated, i.e. performed again, upon mobility events. This keeps control signaling towards the forwarding modules at, or near, a minimum, or at least low.

The embodiments herein provide a scalable approach to the problem of mobility in connection with service chaining for packets of flows in both uplink and downlink direction.

BRIEF DESCRIPTION OF THE DRAWINGS

The various aspects of embodiments disclosed herein, including particular features and advantages thereof, will be readily understood from the following detailed description and the accompanying drawings, in which.

DETAILED DESCRIPTION

Figure 1:
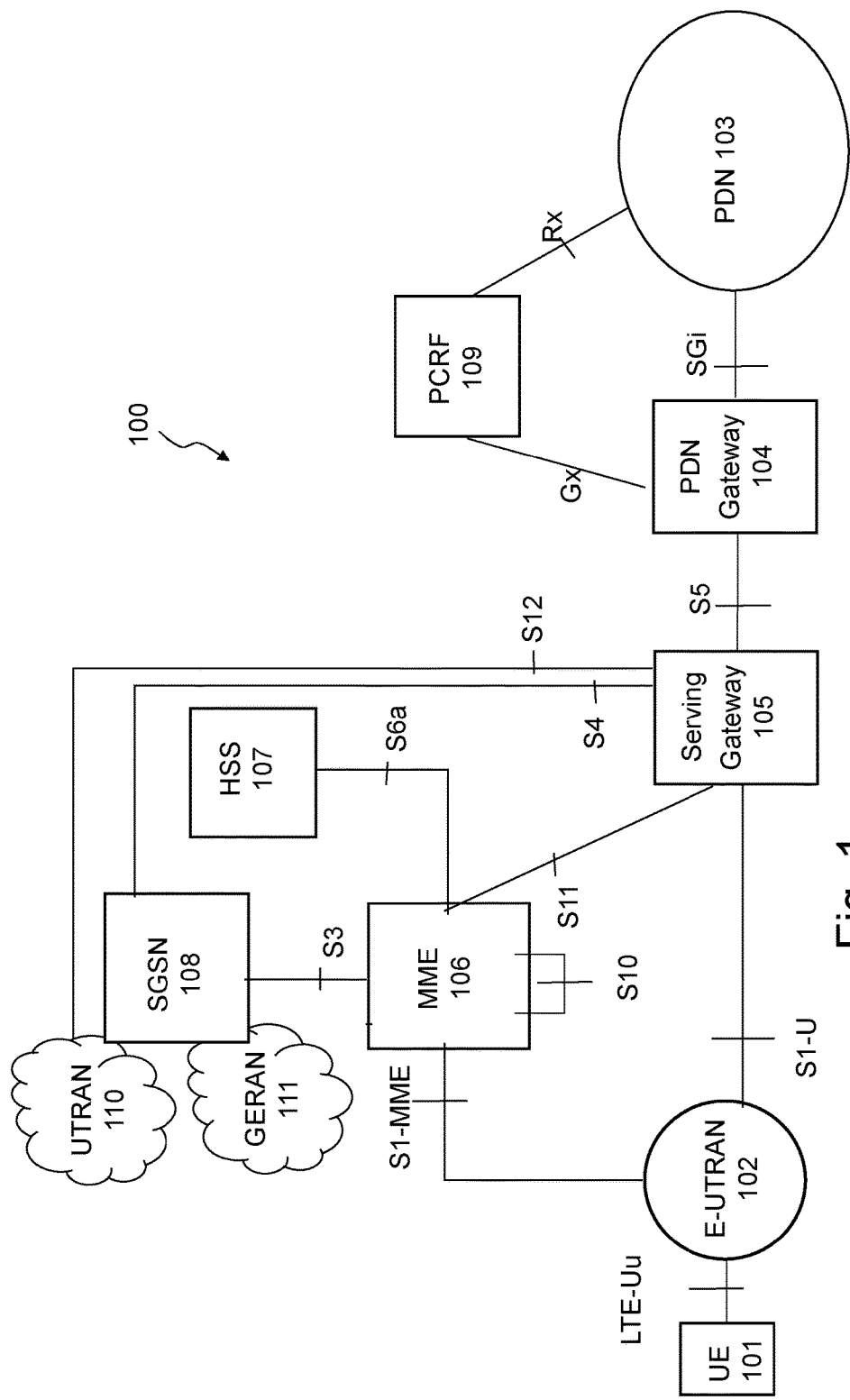
FIG. 1 is a schematic overview of an Evolved Packet Core architecture.
Figure 2:
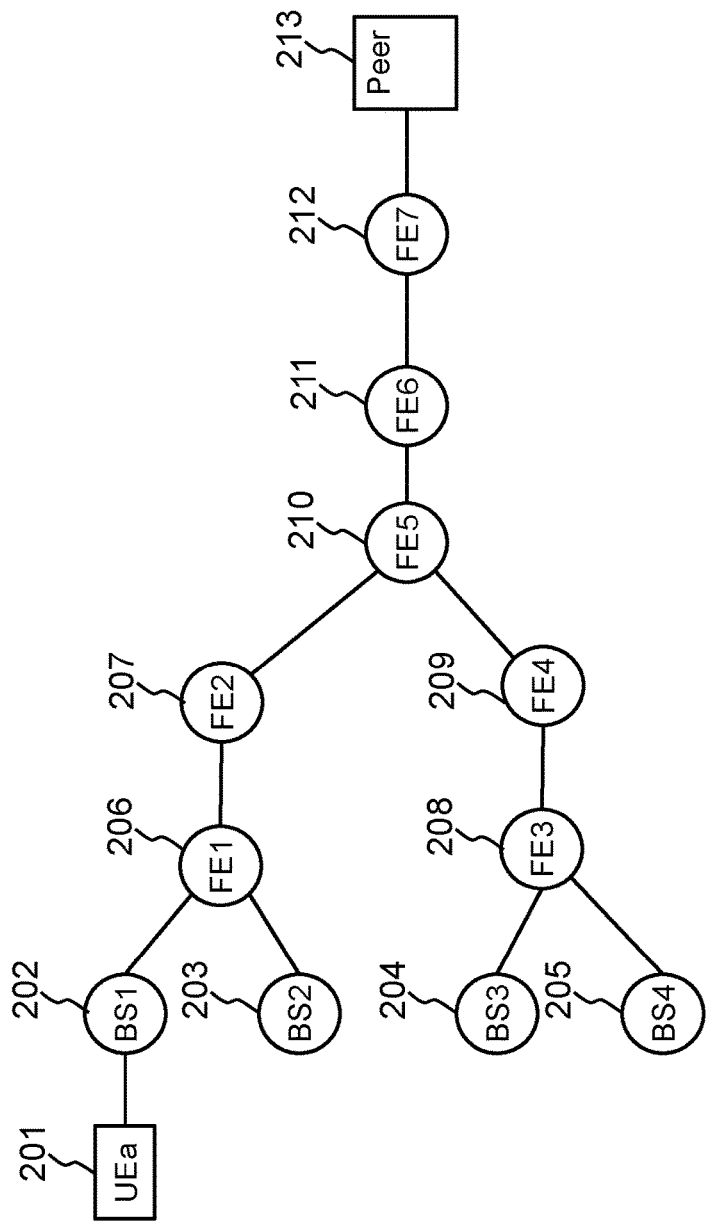
FIG. 2 is a block diagram illustrating base stations and forwarding element of a software defined network.
Figure 3:
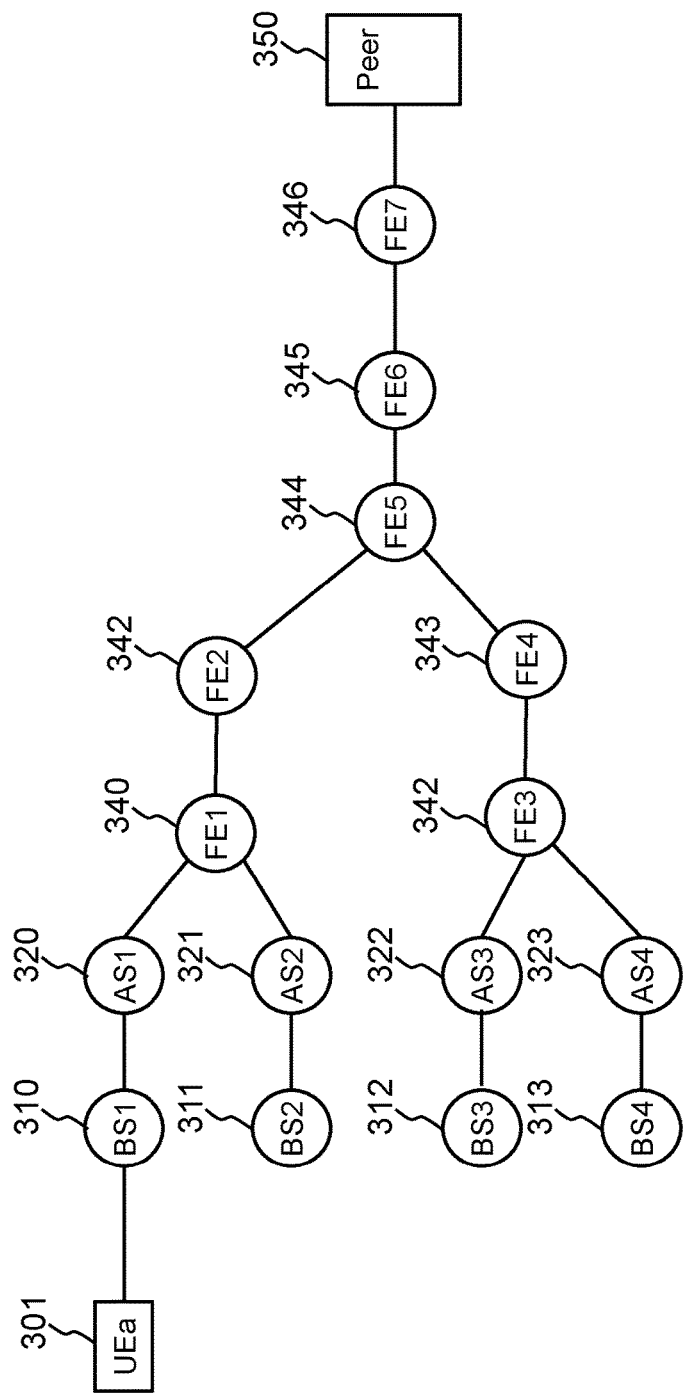
FIG. 3 is a further block diagram illustrating base stations and forwarding element of a software defined network.

Throughout the following description similar reference numerals have been used to denote similar features, such as nodes, actions, steps, modules, circuits, parts, items elements, modules or the like, when applicable. In the Figures, features that appear in some embodiments are indicated by dashed lines.

Figure 4:
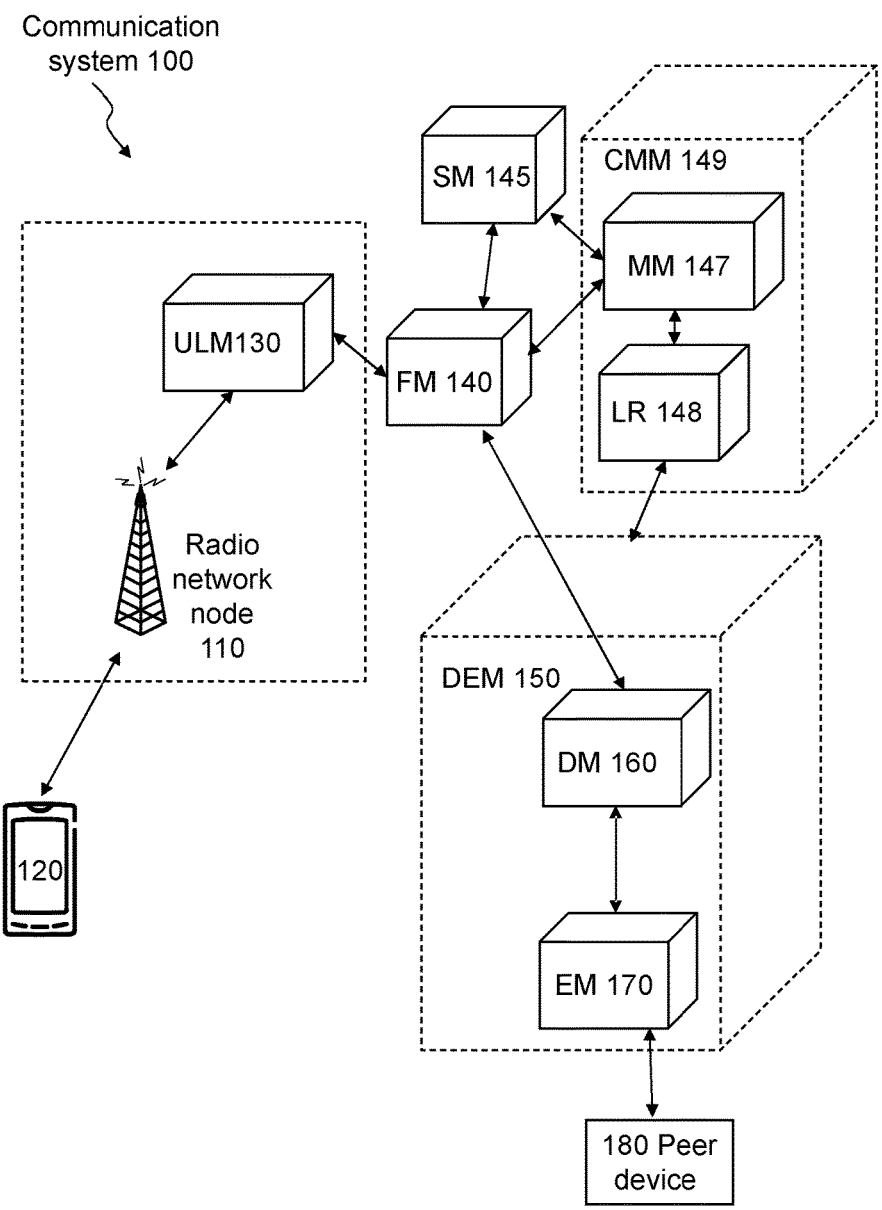
FIG. 4 is a schematic overview of an exemplifying system in which embodiments herein may be implemented.

FIG. 4 depicts an exemplifying communication system 100 in which embodiments herein may be implemented. The communication system 100 is similar to the network architecture shown in FIGS. 7 and/or 9 below.

Accordingly, the communication system 100 is a schematic example of a proposed architecture for a packet core network for 5G (5$^{th}$ Generation mobile communication systems).

The communication system 100 is based on Software Defined Networking. This means that the communication system uses SDN technologies, i.e. the system extends a basic SDN architecture by providing further functional modules in the user plane.

The communication system 100 comprises a control plane and a user plane. Within the communication system 100 the control plane is physically separated from the user plane. The control plane and the user plane may comprise one or more functional modules, referred to as "modules" herein. The control plane, or a functional module therein, may control one or more functional modules in the user plane via an interface, such as OpenFlow or the like. The interface allows the control plane to manage the user plane by e.g. specifying rules for forwarding in the user plane.

The control plane may comprise a management module (MM) 147, such as an eMME shown in FIG. 4. The management module 147 may handle a Location Registry (LR) 148. In some examples, the management module 147 and the Location Registry 148 may be co-located in a co-located management module (CMM) 149.

The communication system 100 comprises a radio network node 110, aka a base station, an uplink module (ULM) 130, a forwarding module (FM) 140, a service module (SM) 145, a downlink module (DM) 160 and an entry module (EM) 170.

The entry module 170 may be co-located with the downlink module 160, thus forming a co-located downlink entry module (DEM) 150. This means that the downlink classifier and the IAP may be separated or may be co-located.

As will be mentioned again, the communication system 100 is anchorless in that IP packets of a flow of IP packets into the communication system 100 are capable of entering the communication system 100 via more than one entry module 170. In the Figures herein, only one entry module 170 is shown for reasons of simplicity.

The forwarding modules may be configured, e.g. by the management module 147, in order to be aware of which tags to inspect and/or where to find certain tags. When the forwarding element has read, or checked, a tag, the forwarding element may know to which further forwarding element, or the radio network node 110, it shall forward the checked packet, which may encapsulate an IP packet.

Furthermore, FIG. 4 illustrates a mobile device 120, or a terminal. For simplicity only one radio network node is shown in Figure p 1. FIG. 4 may be extended to show further radio network nodes as in FIG. 9 below in order to illustrate mobility of the user equipment 120 in a three-level tag hierarchy for a mobile broadband use case.

Additionally, FIG. 4 illustrates a peer, or a peer device 180. The peer device 180 may be of the same or of a different kind as the user equipment 120. An IP connection may have been established between the user equipment 120 and the peer device 180. However, within the communication system 100 IP packets of the IP connection are encapsulated.

As used herein, the term "radio network node" may refer to an evolved Node B (eNB), a Radio Network Controller (RNC), a Radio Base Station (RBS), a control node controlling one or more Remote Radio Units (RRUs), an access point or the like.

The terms "wireless device", "terminal", "user equipment", a machine-to-machine (M2M) device, a mobile phone, a cellular phone, a Personal Digital Assistant (PDA) equipped with radio communication capabilities, a smartphone, a laptop or personal computer (PC) equipped with an internal or external mobile broadband modem, a tablet PC with radio communication capabilities, a portable electronic radio communication device, a sensor device equipped with radio communication capabilities or the like, are used interchangeably herein. The term "user" may indirectly refer to the wireless device. Sometimes, the term "user" may be used to refer to the user equipment or the like as above. It shall be understood that the user may not necessarily involve a human user. The term "user" may also refer to a machine, a software component or the like using certain functions, methods and similar.

Figure 5:
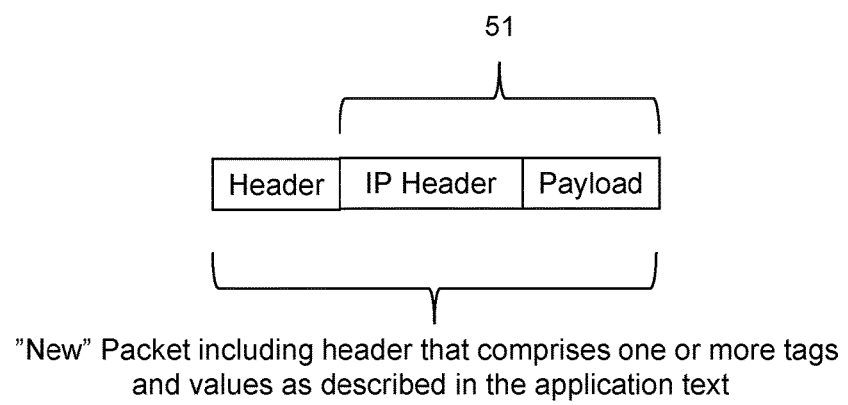
FIG. 5 is a block diagram illustrating encapsulation of packets.

FIG. 5 illustrates encapsulation of an IP packet, comprising an IP header and a payload. The IP packet 51 may e.g. be as defined in Internet Engineering Task Force (IETF) publication RFC 791, which describes e.g. destination/source IP address and option fields of the IP packet 51. A new packet-encapsulating the IP packet—includes a new header and the IP packet 51. Throughout the present disclosure, a type of a packet refers to that the new packet has a different header than the IP packet 51.

In some examples, the term packet may be used to describe any packet. In sub-examples to such some examples, it may be explained that such any packet may be of type "IP packet" or "new packet", i.e. which new packet has a header that is different from the header of the IP packet 51.

Figure 6:
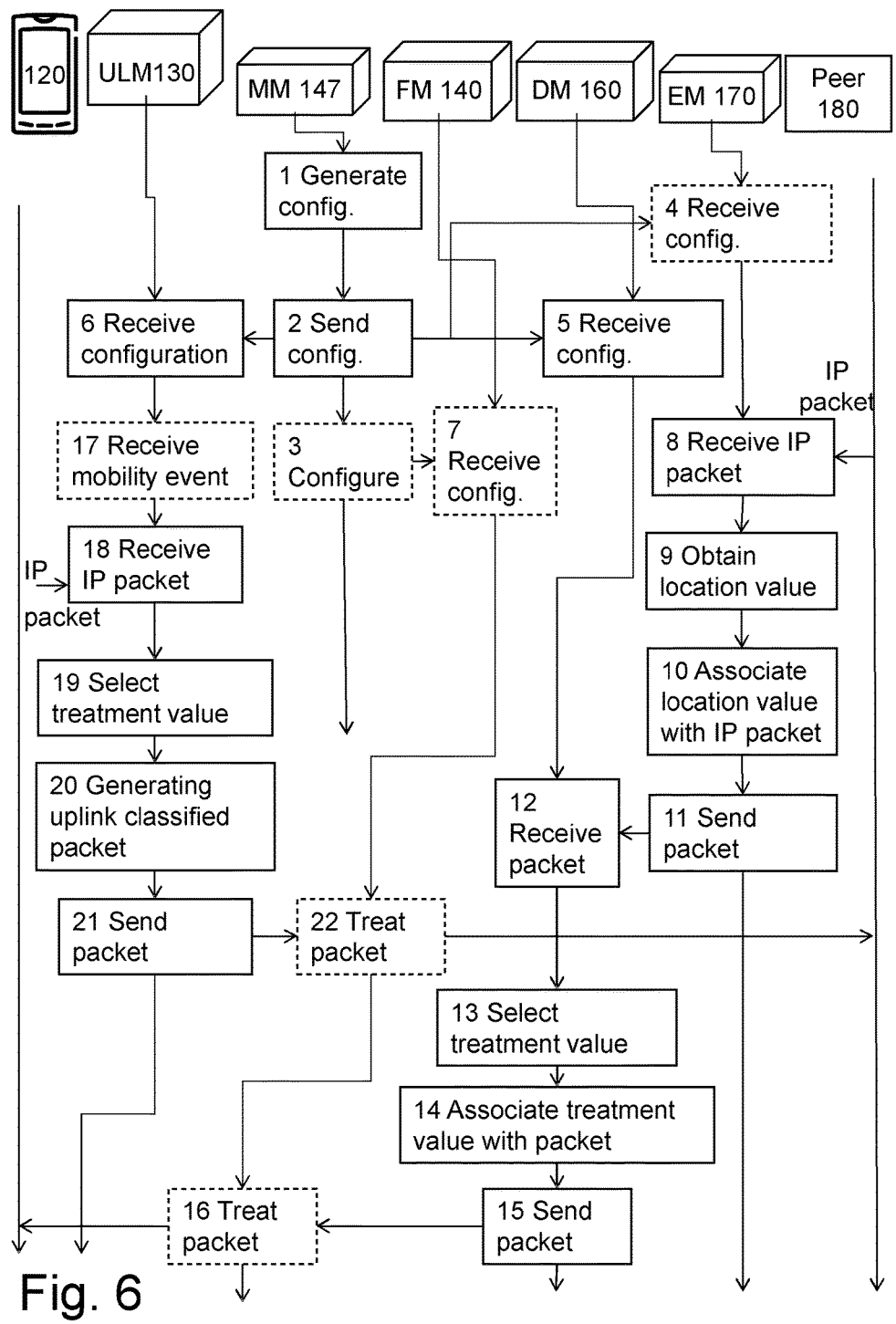
FIG. 6 is a combined signaling and flowchart illustrating the methods herein.

FIG. 6 illustrates an exemplifying method according to embodiments herein when performed in connection with the communication system 100 of FIG. 1.

The communication system 100 may be based on Software Defined Networking elements. This may mean that the communication system includes at least one forwarding module for managing packets by invoking one or more networking services associated to the forwarding element, and for forwarding packets towards the downlink and/or uplink module, e.g. passing another forwarding module. Ultimately, the packet reaches the mobile device 120 or the peer device 180 depending on whether the packet is forwarded uplink or downlink.

Moreover, the communication system 100 is anchorless, which means that downlink packets of the same flow may enter the communication system 100, e.g. an operator's network, through multiple entry modules, and thus also through multiple different downlink modules. All downlink packets within the same flow takes the same path through the communication system 100, thus passing the same chain of service modules, or instances thereof, and reaches the same radio network node.

Notably, as mentioned, the communication system 100 may comprise one or more forwarding modules, each of which may invoke one or more service modules, also referred to as User Plane Functions, e.g. networking services. The service modules may be realized as multiple instances associated to different forwarding modules.

In some embodiments herein, there are three types of tags.

A first type of tag, TagUE or identity tag name of mobile device, may identify the user equipment, its value may be the IP address of the user equipment.

A second type of tag, TagBS or location tag name, may identify the base station, via which the user equipment may be reached, i.e. via which the user equipment may send/receive IP packets. Its value identifies to which radio network node the mobile device is attached.

A third type of tag, TagD, may identify a path for IP packets towards, or from, the user equipment. A value of TagD need not be the same for uplink IP packets and downlink IP packets. The third type of tag is referred to by the term "service tag name".

Its value identifies which treatment packets travelling in the communication system shall obtain.

The three types of tags are applied to IP packets throughout the path between the mobile device 120 and the peer device 180, i.e. not only for a so called segment of the path.

To conclude, information to be provided by the tags include: a) which user/UE a packet belongs to; b) where a packet is heading (which BS), aka location tag; c) what service chain the packet should get, aka service tag. This information may be encoded in three tags, but it may also be encoded into two, one, or more than three tags.

The entry module 170 performs a method for managing packets in a communication system 100 based on Software Defined Networking.

The downlink module 160 performs a method for managing packets in a communication system 100 based on Software Defined Networking.

The management module 147 performs a method for managing configuration information in a communication system 100 based on Software Defined Networking.

The uplink module 130 performs a method for managing packets in a communication system 100 based on Software Defined Networking.

The IP packet may be associated with a flow of IP packets from the peer device 180 to the mobile device 120, wherein at least some other IP packets of the flow are receivable by a further entry module of the communication system 100. Typically, another flow of IP packets, i.e. a second flow associated with another IP address possibly related to the same mobile device, may enter the communication system via another entry module. Moreover, it shall be understood that once the mobile device moves in the communication system 100, it may happen that the flow, i.e. a first flow of IP packets, is moved such that it passes through another entry module after the movement.

The communication system 100 is anchorless in that the entry module 170 is capable of being one of many entry modules for receiving the IP packet, with the destination IP address, into the communication system 100 from any communication network neighboring thereto.

One or more of the following actions may be performed in any suitable order.

Action 1-6 relates to configuration, by the management module, of the modules in the user plane.

Action 1

The management module 147 generates first configuration information.

The first configuration information indicates a location tag name and location values, wherein each location value is associated to a respective radio network node to which the mobile device 120 is capable of attaching.

In this manner, the first configuration information, to be sent to the entry module 170, may make the entry module 170 aware of possible location values and which ports of the entry module 170 are associated to the location values.

Additionally or alternatively, the management module 147 generates second configuration information.

The second configuration information may include information about which tags to use and possible values. For example, the second configuration information may include instructions what tag names and values to add to packets of a certain IP flow. E.g. "All packets towards Internet are tagged with TagD and value x".

The second configuration information indicates a treatment tag name, such as 'TagD' above, and treatment values and a rule for treatment, performed by the forwarding module 140, of the packets. The rule of the second configuration information may specify how to select a treatment value based on destination IP address and/or source IP address of a packet.

In further examples, the treatment value may be selected based on source or destination port. E.g. the port may reveal a service address, provided by the service module and carried by a packet. Then the packet may get a higher QoS, i.e. more prioritized treatment, if the packet carries certain services.

In yet further examples, packets to/from Wireless Local Area Network WLAN node may obtain different treatment than packets to/from a cellular base station, such as an LTE base station.

In some examples, the second configuration information, to be sent to the uplink/downlink modules, may also specify that if the location value of the location tag name of a received packet is equal to 'x', then the uplink/downlink modules should forward the packet to port 'z' of the uplink/downlink module 140. In this case, the uplink/downlink modules also perform actions typically performed by forwarding module(s).

Action 2

In order to make the entry module 170 aware of the first configuration information which keeps track of the location of the mobile device 120, the management module 147 sends the first configuration information to the entry module 170. Alternatively or additionally, the management module 147 sends the second configuration information to the downlink module 160 and/or the uplink module 130.

Action 2 may be performed before the mobile device 120 attaches to the system. This may mean that the uplink/downlink modules may be configured with aggregate information that serves multiple mobile devices.

Generally, action 2 is performed without triggering by mobility of the mobile device 120.

Action 3

As mentioned, the forwarding module 140 may typically not need to be re-configured due to mobility of the mobile device 120.

Thus, the management module 147 may configure the forwarding module 140 with third configuration information without triggering by mobility of the mobile device 120, wherein the third configuration information specifies to which port a packet, having a location value of the set of location values, is to be forwarded.

Expressed differently, the forwarding module 140 may be configured by the management module 147 with third configuration information, the forwarding module 140 comprising ports towards further forwarding modules and/or the service module 145, wherein the third configuration information specifies to which port a packet, having the location value, is to be forwarded.

As an example, the third configuration information, to be sent to the forwarding module 140, may specify that if the location value of the location tag name of a received packet is equal to 'x', then the forwarding module 140 should forward the packet to port 'z' of the forwarding module 140.

In this manner, a mapping from location values to which port a packet is to be forwarded is achieved.

Action 4

The entry module 170 may receive, from the management module 147 first configuration information indicating the location tag name and location values associated thereto, wherein each location value is associated to a respective radio network node to which the mobile device 120 is capable of attaching.

Action 5

The downlink module 160 receives, from the management module 147, second configuration information indicating a treatment tag name, and treatment values.

Action 6

The uplink module receives, from the management module 147, second configuration information indicating a treatment tag name, and treatment values.

Now that the entry module 170, the forwarding module 140 and the downlink/uplink modules have been configured, the communication system 100 is set up and ready to manage packets travelling between the mobile device 120 and the peer device 180.

Action 7

The forwarding module 140 may receive the third configuration information from the management module 147, e.g. when the management module 147 configures the forwarding module 140 by sending the third configuration information to the forwarding module 140.

Action 8

Thus, the entry module 170 receives an IP packet from the peer device 180. The IP packet includes a destination IP address associated with the mobile device 120. The IP destination address will be used in action 9 to find out to which the radio network node 110 the mobile device 120 is attached.

Action 9

This action may be performed in response to action 8 or this action may be performed before action 8.

The entry module 170 obtains, from the management module 147, a location value specifying the radio network node 110 associated with the destination IP address.

In order for the management module 147 to be aware of the location value, it keeps track of the location of mobile device 120. For example, a radio network node to which the mobile device has attached may report, or send, to the management module 147 that the mobile device 120 with a certain IP address has attached to it.

The management module 147 may then push the certain IP address and the location value corresponding to the radio network node, to which the mobile device has attached, to the entry module 170. Alternatively, the management module 147 may send, to the entry module, the certain IP address and the location value upon request from the entry module 170.

Action 10

Subsequent to action 9, the entry module 170 now being aware of the location value associated with the destination IP address of the IP packet received in action 8, the entry module 170 associates the location value with the IP packet. The location value is related to the location tag name, indicating the radio network node 110 that serves the mobile device 120, thereby obtaining a packet.

In a first example, the entry module encapsulates the IP packet to form the packet. This may mean that the associating 10 of the location value with the IP packet may comprise generating the packet by encapsulating the IP packet, wherein the packet includes a header comprising the location value and, optionally, the tag name.

In a second example, the packet may be the IP packet. This means that existing fields of the IP packet are used to store the location value within the IP packet, i.e. without changing a type of the packet. Hence, the associating 10 of the location value with the IP packet may comprise setting the location value as a first option value of the IP packet. As mentioned above, option fields that may include option values are known for IP packets. In this second example, it may be that the destination IP address may be replaced by the location value. Then, the radio network node 110 may re-insert the destination IP address into the IP packet when sending the IP packet to the mobile device. Alternatively, a new IP option is added to the IP header of the packet.

Action 11

The entry module 170 sends the packet, via the forwarding module 140, towards the radio network node 110 as indicated by the location value of the location tag name.

In some examples, the entry module 170 is directly connected to the downlink module 160 which then will use the location value to find out towards which port thereof it shall forward the packet.

In some other examples, the entry module 170 may be connected to the downlink module 160 via one or more forwarding modules which then also will use the location value to find out towards which port thereof they shall forward the packet.

In action 12-15, it is described how the downlink module 160 enables efficient service chaining.

Action 12

Subsequent to action 11, the downlink module 160 receives, via the entry module 170, a packet from the peer device 180.

Action 13

The downlink module 160 selects a treatment value out of the treatment values based on information included in the packet, thereby classifying the packet.

For example, the information may include destination/source IP address of the packet as specified by the above mentioned rule of the second configuration information.

In some examples, the downlink module 160 may update the location value associated to the packet. In this case, the downlink module 160 may obtain the location value from the management module 147 similarly to how the entry module 170 obtains the location value. An advantage may be that the entry module 170 may update its location values less frequently. See also FIG. 14 below.

Action 14

After action 13 has been performed, the downlink module 160 associates the treatment value with the packet, wherein the treatment value is related to the treatment tag name.

In some embodiments, the packet may be encapsulated. In some examples, this may be a further encapsulation in relation to the encapsulation that may be performed by the entry module 170 in action 10. In other embodiments, a type of the encapsulated packet of action 10 may include specify fields that are filled in by the downlink module 160 in this action.

Therefore, the associating 14 of the treatment value with the packet may comprise generating a downlink classified packet by encapsulating, either directly or indirectly, the IP packet, wherein the downlink classified packet includes a header comprising the treatment value and, optionally, the treatment tag name. Here a direct encapsulation may mean that the IP packet is reveal when the header of the downlink classified packet is removed. An indirect encapsulation may mean that further headers, possibly added in action 10, may need to be removed before the IP packet is revealed.

An identity value of the mobile device 120 may be used as a new tag, called an device tag name, or UE tag name. For examples, the identity value helps in identifying the mobile device 120 in case of downlink broadcast/multicast packets, in which case the IP address does not reveal the identity of the mobile device 120.

Thus, the associating 14 of the treatment value with the packet may comprise associating an identity value of the mobile device 120 with the identity tag name by encapsulating the packet, wherein the header of the downlink classified packet further includes the identity value. This identity tag may be used by the radio network node 110 in order to find out to which mobile device 120, attached thereto, to send the packet to.

In some examples, the associating 10 of the packet does not alter the type of the packet. This may mean that the packet may be an IP packet. Accordingly, the associating 14 of the treatment value with the packet comprises setting the treatment value as a second option value of the IP packet.

Moreover, in case the packet is an IP packet, the destination IP address of the IP packet may be used to identify the mobile device 120. In this case, the radio network node 110 uses the destination IP address to find out to which mobile device 120, attached thereto, to send the packet to.

When the mobile device moves in the communication system 100, the path, e.g. via which forwarding modules the packets to the mobile device goes, will most likely change. This means that the packets are now forwarded by different forwarding modules than before the mobile device moved, i.e. there are old forwarding modules in an old path as before movement and there are new forwarding modules in a new path as after the movement. Some forwarding modules may of course remain the same.

This also means that an old service module that previously handled packets to the mobile device may not be reachable anymore, i.e. by the new forwarding modules that now treats the packets. Therefore, a context of the old service module for that mobile device 120 needs to be moved from the old service module to a new service module. Note that the old and new service module perform the same function. Normally, the old and new service modules are executing on different physical locations, and are thus connected to different forwarding modules. As will be explained further below, the old and new service modules may be different instances of the same functional module.

Action 15

The downlink module 160 sends the packet and the associated treatment value, via the forwarding module 140 which performs the treatment of the packet according to the treatment value, towards the radio network node 110. This may mean that the mobile device 120 does not necessarily receive the treatment value. In some examples, the treatment value may be peeled off by the radio network node 110, before transmitting the packet to the mobile device 120 over a radio interface.

Action 16

The treatment of the packet may comprise invoking, by the forwarding module 140, at least one service provided by the service module 145. The forwarding module 140 may of course invoke one or more service modules, each of which provides one or more services. The invoking of service module is however performed by the forwarding module according to the treatment value.

The treatment of the packet may specify a rule for how the forwarding module 140 performs forwarding. In this case, no service module is invoked. The treatment value may specify priority between different packets by means of the treatment value, e.g. in order to provide Quality of Service QoS-functionality. The priority may be in terms of in which order received packets may be sent or in terms of which ports of the forwarding module to forward to. Here different ports may have different capacity, either inherently or e.g. due to load.

Action 17

The Uplink module 130 may receive a mobility event, when the mobile device has moved to a new location, at least one entry module, and possibly also one or more downlink modules, gets updated such that packets for that device get marked with the same tag names, such as the location tag name, but where one or more tags have an updated value, i.e. the location value. The updated value reflects the new location of the mobile device, e.g. reflects the radio network node serving the mobile device at the new location.

Action 18

The uplink module 130 receives, via the radio network node 110, an IP packet from the mobile device 120.

The radio network node 110 knows to which uplink module is shall send the uplink IP packets. One way of achieving this is by allowing the uplink module to be co-located with the radio network node. However, the uplink module and the radio network node may also be separated. The uplink module may therefore, after the mobile device 120 has moved to a radio network node associated thereto receive uplink packets coming from the mobile device 120.

For the radio network node, the movement of the mobile device 120, i.e. mobility of the mobile device may be seen as an event. According to known manner, the radio network node performs various tasks to take care of the mobile device 120 that attempts to attach to it.

In contrast thereto, the uplink module merely continues to mark, see action 20, IP packets according to the rules it already has received, see action 6 above.

Action 19

The uplink module 130 selects a treatment value out of the treatment values based on information included in the packet, thereby classifying the IP packet. As for the downlink module 160, the information may include destination/source IP address of the IP packet.

In some examples, the information may include parameter value marked at the IP packet by the radio network node. The parameter value may specify subscriber status, such as gold, silver, bronze and default, which would lead to different treatment by the forwarding module 140.

Action 20

The uplink module generates an uplink classified packet encapsulating the treatment value and the IP packet, wherein the treatment value is related to the treatment tag name. Notably, the uplink classified packet is different from an IP packet, i.e. the header of the uplink classified packet is different from a known IP packet header. Therefore, the uplink classified packet is a different type of packet compared to a type of the IP packet.

Moreover, the generating 20 of the uplink classified packet may comprise further encapsulating an identity value of the peer device 180 with an identity tag name for the peer device 180, into the uplink classified packet.

Action 21

The uplink module sends the uplink classified packet, via the forwarding module 140 which performs the treatment of the uplink classified packet according to the treatment value, towards the peer device 180.

The treatment of the packet may comprise invoking, by the forwarding module 140, at least one service provided by the user plane module 145.

The treatment of the packet may specify a rule for how the forwarding module 140 performs forwarding.

Action 22

Similarly to action 16, but for uplink packets, the forwarding module 140 may treat the packets.

Now a few more detailed examples will be described. The terms in the subsequent sections correspond to the terms used above as follow:
  mobile device—UE, terminal,
  peer device—peer device, or peer for short,
  radio network node—base station,
  entry module—IAP,
  downlink module—downlink classifier,
  forwarding module—forwarding element,
  service module—User Plane Function,
  uplink module—uplink classifier,
  management module—control node, eMME.

Figure 7:
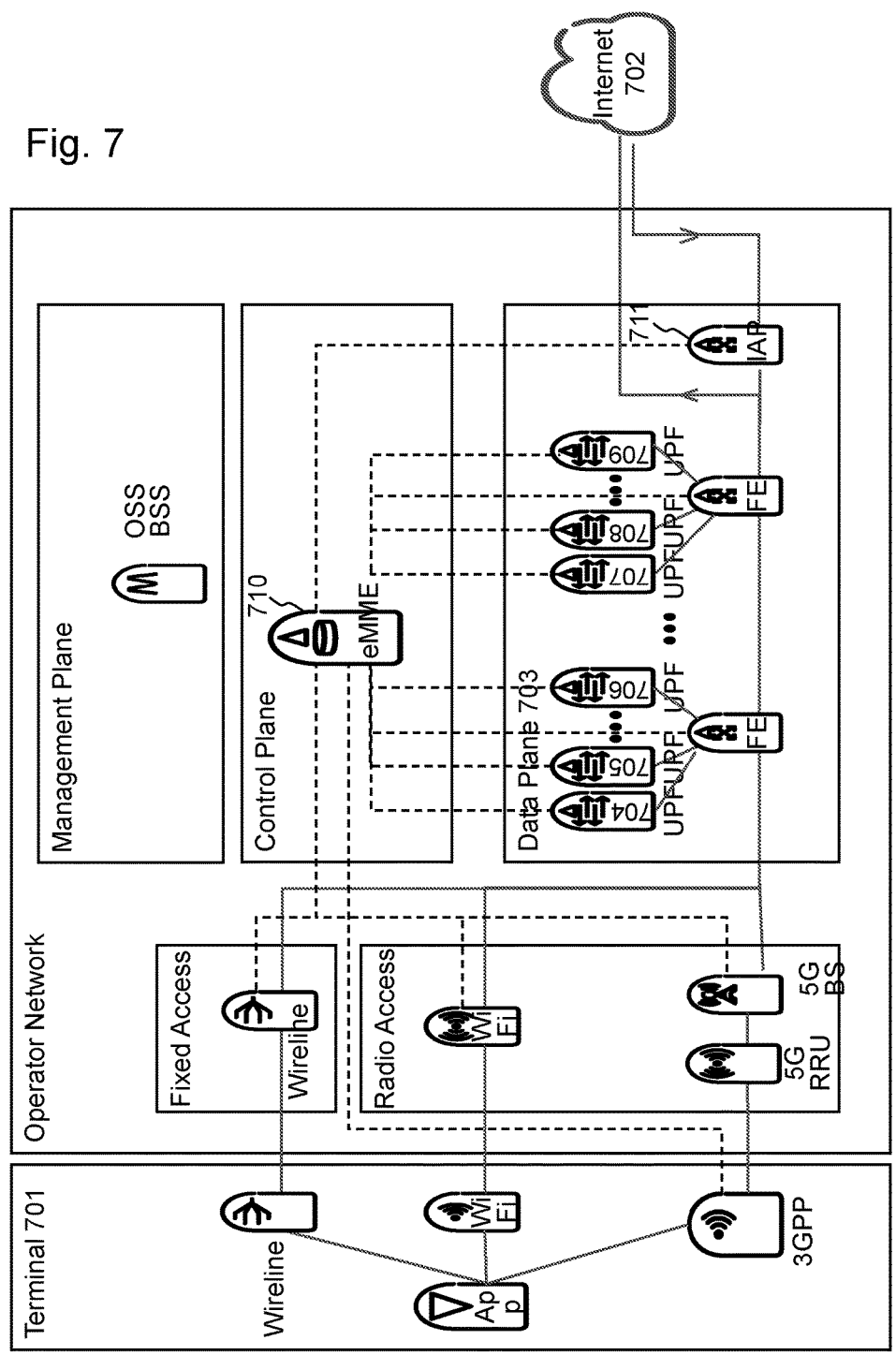
FIG. 7 is an illustration of a software defined network according to embodiments herein.

A more detailed illustration of the proposed architecture for a packet core network for 5G (5$^{th}$ Generation mobile communication systems) is shown in FIG. 7. FIG. 7 shows the functional view of the proposed architecture.

A terminal (UE) 701 talks to a peer (not shown) on a network via fixed or radio access and via an operator's data plane. The network is here called as "Internet" 702 but could just as well be a part of the operator's network. A data plane 703 contains one or more User Plane Functions (UPFs) 704-709. The terms "Data Plane" 703 and "User Plane" are used interchangeably herein. UPFs are functions, or services, chained together. Collectively they implement core network functions, such as networking services. This could be IP-layer functions (e.g. proxy, firewall) or radio-layer functions (e.g. PDCP termination). Function chains, or service chains, may be on different granularity; e.g. a group of UEs, a single UE, or even a single IP flow for a single terminal 701. A chain may be symmetrical or asymmetrical uplink/downlink, and a UPF may serve uplink or downlink or both.

A control node, such as an evolved Mobility Management Entity (eMME) 710, manages the data plane nodes, such as the UPFs 704-709. It contains a number of control plane functions, including: traditional MME functionality as in existing EPC; a controller for the UPF service chain; and a Location Registry (LR) which is a table, or similar, comprising information on where the UE currently is located, i.e. at which base station it is connected to.

An IAP (IP Advertisement Point) 711 is the point where static IP routing to/from "Internet" takes the user's traffic. Uplink traffic does not need to pass the IAP 711. For downlink traffic, IAP 711 queries the LR (not shown) to find out where the terminal 701 is located, i.e. where the packet is to be routed. The frequency of these requests can be optimized in several ways. E.g. the IAP 711 can retrieve all routing rules for a particular UE IP address and cache those. The eMME 710 may also push updated location information to the IAP 711. Multiple IAPs may advertise the same IP address. This way, there is no single entry point for this terminal's 701 IP address in the packet core network as the PGW (not shown) is for the EPC. In other words, the proposed architecture allows for an anchorless operation.

FIG. 7 includes, for completeness of the Figure, further elements that are not explicitly involved in the service chain. Thus, in order to not complicate the Figure, reference signs for these elements are omitted.

Packets are forwarded between UPFs by Forwarding Elements (FE) 801-805. See FIG. 8, which illustrates a service chain example for a mobile broadband use case. The Forwarding Elements may perform switching based on the information of one or more fields in the packet header. The switching may be IP routing or Software Defined Networking (SDN) switching. The embodiments herein may preferably be applied to switching in SDNs. An FE forwards each packet to one of its outbound port based on rules it has received from eMME. It drops a packet when there is no rule match for a packet. It does not modify a packet. The forwarding rules in an FE may apply on fields in the packet's header. A header is defined as a sequence of fields preceding a payload, e.g. the payload of a received IP packet.

Figure 8:
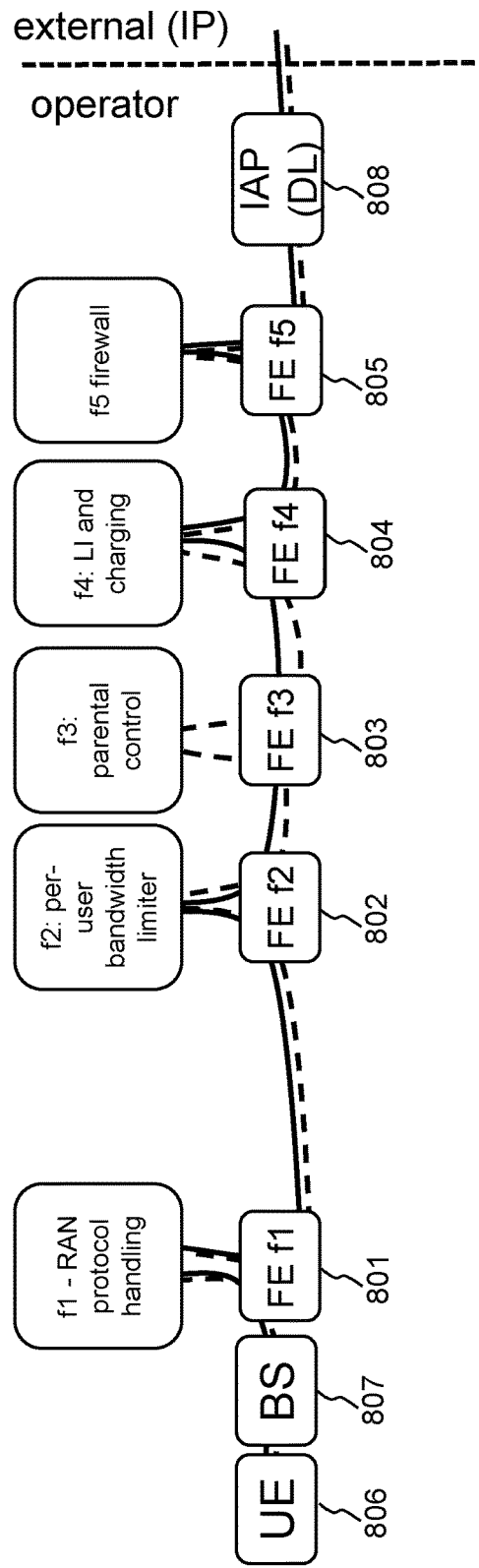
FIG. 8 is a block diagram illustrating network set up for a mobile broadband use case.

FIG. 8, mentioned above, shows an example of a network setup for a mobile broadband use case. It has five UPFs: radio protocol handling, a bandwidth limiter, parental control, charging and a firewall. All traffic passes the Forwarding Elements f1 801, f2 802, f4 804, f5 805 in both uplink and downlink (solid line). Function f1 801 may include a set of functions like encryption (over the air link), header compression and radio flow control. Depending on subscription, some users also get their traffic routed through f3 803 (dashed line).

FIG. 8 further shows a UE 806, a base station (BS) 807 and an IAP 808.

Note that FIG. 7 only describes the functional view of the architecture. The architecture may be deployed in a distributed way; e.g. a UPF like "RAN protocol handling" may be co-located with the BS on a base station site, and the "firewall" UPF may be running in a centralized national data center. The UPFs may be running on a distributed cloud environment that potentially spans over all the deployment sites.

The embodiments herein are applicable to the core network architecture presented in FIG. 7. However, the core architecture of FIG. 7 is further expanded in order to enable a combination of that architecture with service chaining.

According to embodiments herein one or more tags are added to every individual packet. The tags are used to enable mobility of mobile devices in an efficient manner. A tag is conceptually a name/value pair. E.g. a UE could be identified with a 128-bit tag value with the tag name "UE ID". The name can be encoded explicitly as a field in a packet's header. This approach is e.g. used in the Internet Engineering Task Force (IETF) Geneva protocol (https://tools.jetf.org/html/draft-gross-geneve-02). Alternatively, the name is not encoded as a field in a packet's header, but it is know that e.g. a certain position in the header holds the value of a certain tag. E.g. the source address in an IPv4 packet header always starts on bit number 96 and is 32 bits long (https://www.ietf.org/rfc/rfc791.txt). FEs in the chain know how to interpret the tags and forward based on the information in one or more tags.

Tags are set by a classifier (CL) in both uplink and downlink, i.e. an uplink and downlink classifier, receptively. In the uplink the classifier may be, but does not need to be, co-located with the base station. In the downlink the classifier may be, but does not need to be, co-located with the IAP. There are one or more classifiers in the uplink, and one or more classifiers in the downlink.

Figure 9:
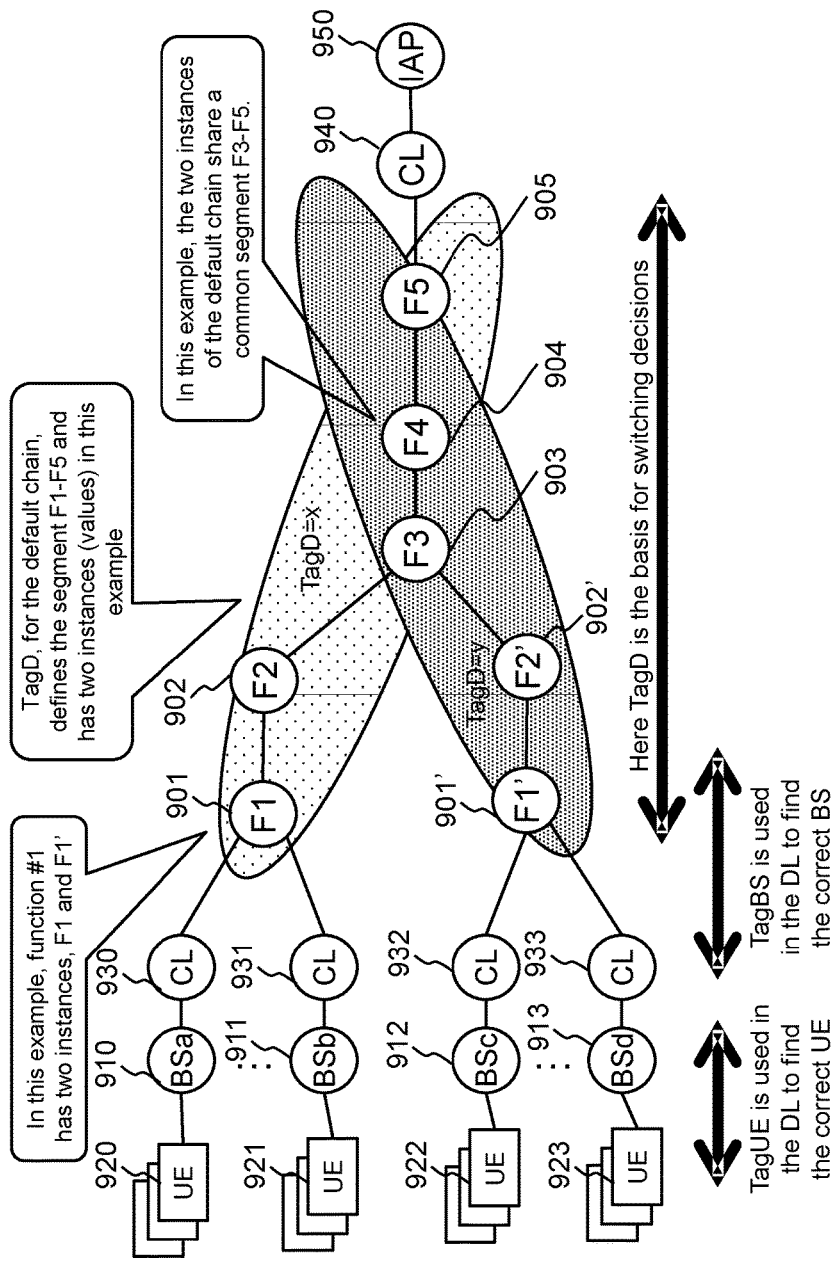
FIG. 9 is a further block diagram illustrating an exemplifying network set up.

FIG. 9 shows an example with a network setup where a hierarchy of three tags is used. A first tag denotes the UE ID, a second tag denotes the BS ID, a third tag denotes a "default chain" called TagD. This is the normal chain of functions that is used for all packets to/from Internet; i.e. this is the operator's mobile broadband offering. The functions (F1 through F5) 901-905, 901'-902', such as user plane functions, resemble the functions mentioned in the mobile broadband use case example above.

In this example four base stations 910, 911, 912, 913 are drawn, also referred to as BSa 910, BSb 911, BSc 912 and BSd 913. Each base station 910-913 may serve multiple UEs 920, 921, 922, 923. An uplink classifier (CL) 930, 931, 932, 933 is close to the base station. There are two instances of F1 901 and F2 902, i.e. a first and a second User Plane Function (forwarding elements are not shown for simplicity—see FIG. 8 for description of UPFs and FEs). The additional instances are F1' 901' and F2' 902'. For the segment F3 903-F4 904-F5 905 there is only a single set of function instances. This setup may be based on network topology. E.g. F3 903-F4 904-F5 905 are located in a national data center site, F1 901 and F2 902 are located in a local switching center sites, and the base stations 910-913 and uplink classifiers 930-933 are located in base station sites.

As shown in FIG. 9, TagD is used for all switching between F1 901 through F5 905. All packets tagged with TagD traverse the same function. But the value of TagD determines through which instances of these functions the packets traverse. Assume now that a UE 920 in FIG. 9 moves from BSa 910 to BSc 912, then its UPF in F1 901 would need to be performed by UPF F1' 901' (while of course performing the same function). Also switching would, when the UE 920 has moved to BSc 912 from BSa 910, be performed by the FE (not shown) of F1' 901' instead of the FE (not shown) of F1 901. According to the embodiments herein, the moving of the UE 920 from BSa 910 to BSc 912 does not imply any reconfiguration of the FE (again not shown) of F1' 901'

FIG. 9 further illustrates a downlink classifier 940 and an IAP 950.

Figure 10:
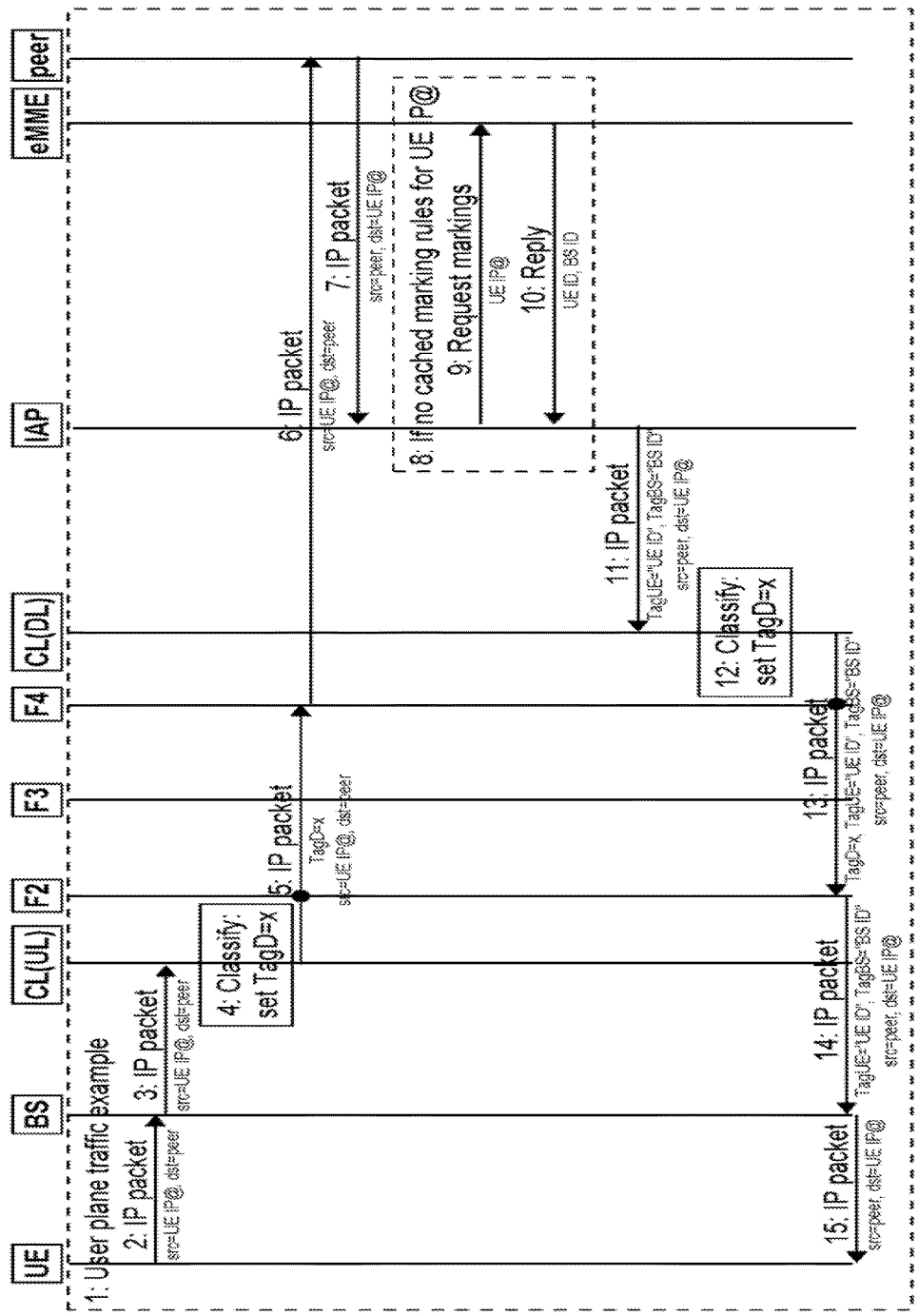
FIG. 10 is a further combined signaling and flowchart illustrating an embodiment herein.

FIG. 10 shows how uplink and downlink traffic would be forwarded using a three-level tag hierarchy. Uplink, the CL classifies the packet with a TagD tag. Downlink, the IAP does a lookup in the LR to find out where the UE currently is. The lookup key is the destination IP address of the downlink packet. As a reply, the IAP receives the BS ID of the UE. That is added as tag to the packet. The IAP may even set the UE ID tag. Alternatively, the destination address of the packet serves as UE ID.

Figure 11:
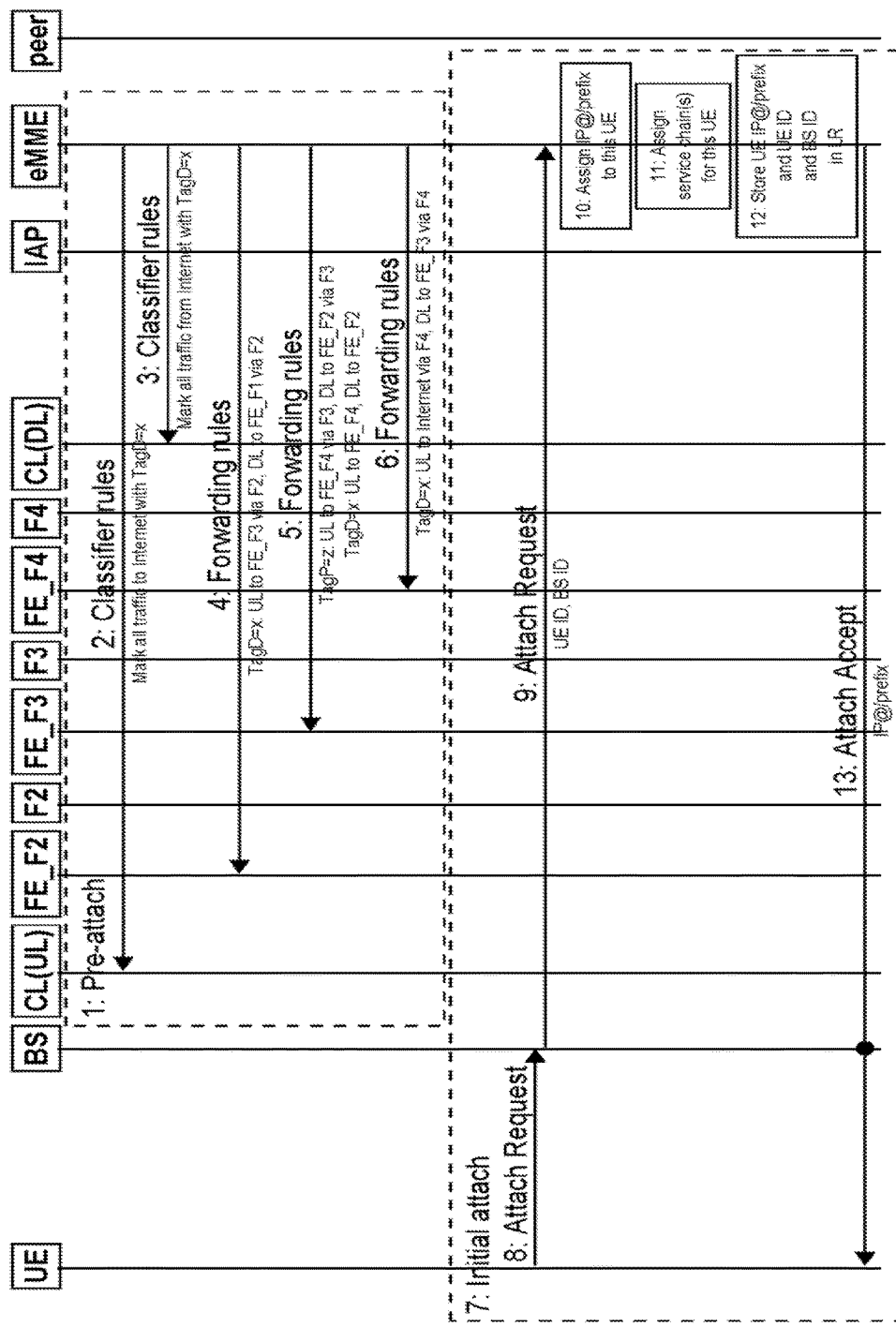
FIG. 11 is a still further combined signaling and flowchart illustrating a further embodiment herein.

The only missing piece is how the uplink and downlink classifiers know that TagD should be set, and which value. FIG. 11 illustrates how to pre-configure rules for the communication system 100, e.g. a mobile broadband use case.

FIG. 11 shows the UE attaching to the network (block 7). From the UE perspective, the attach procedure is the same as in today's EPC. All rules, both the rules to the classifiers (step 2-3) and the rules to the FEs (step 4-6), can be setup before the UE attaches. The uplink classifier close to BSa and BSb could in this example say "all traffic towards Internet should be tagged with TagD=x. Note that this approach enables aggregation of rules. The rules to the classifiers need to be configured only once, regardless how many UEs attach. The same goes for the forwarding rules for the FEs.

Figure 12A:
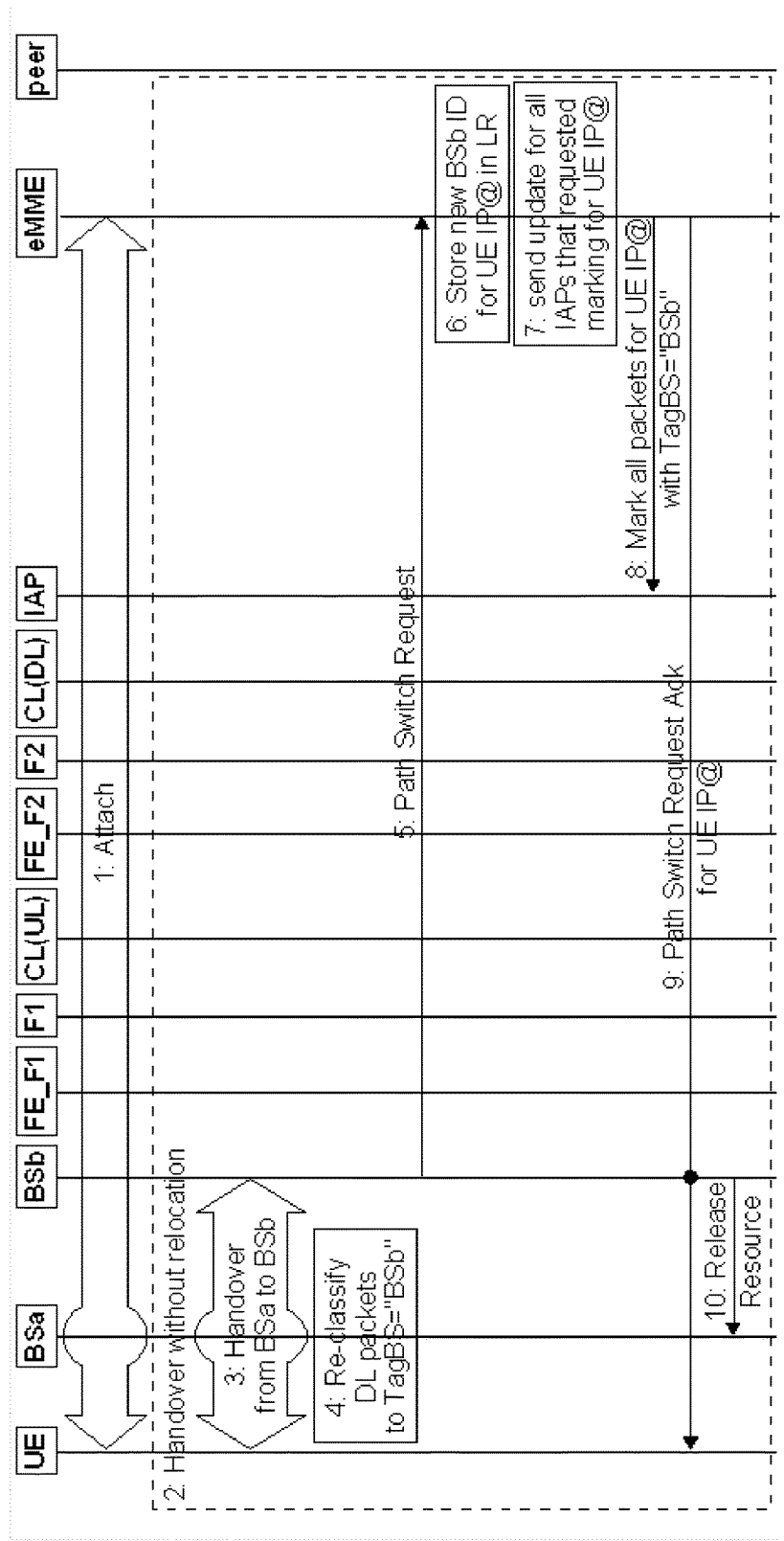
FIGS. 12a and 12b are yet further combined signaling and flowcharts illustrating a yet further embodiment herein.
Figure 12B:
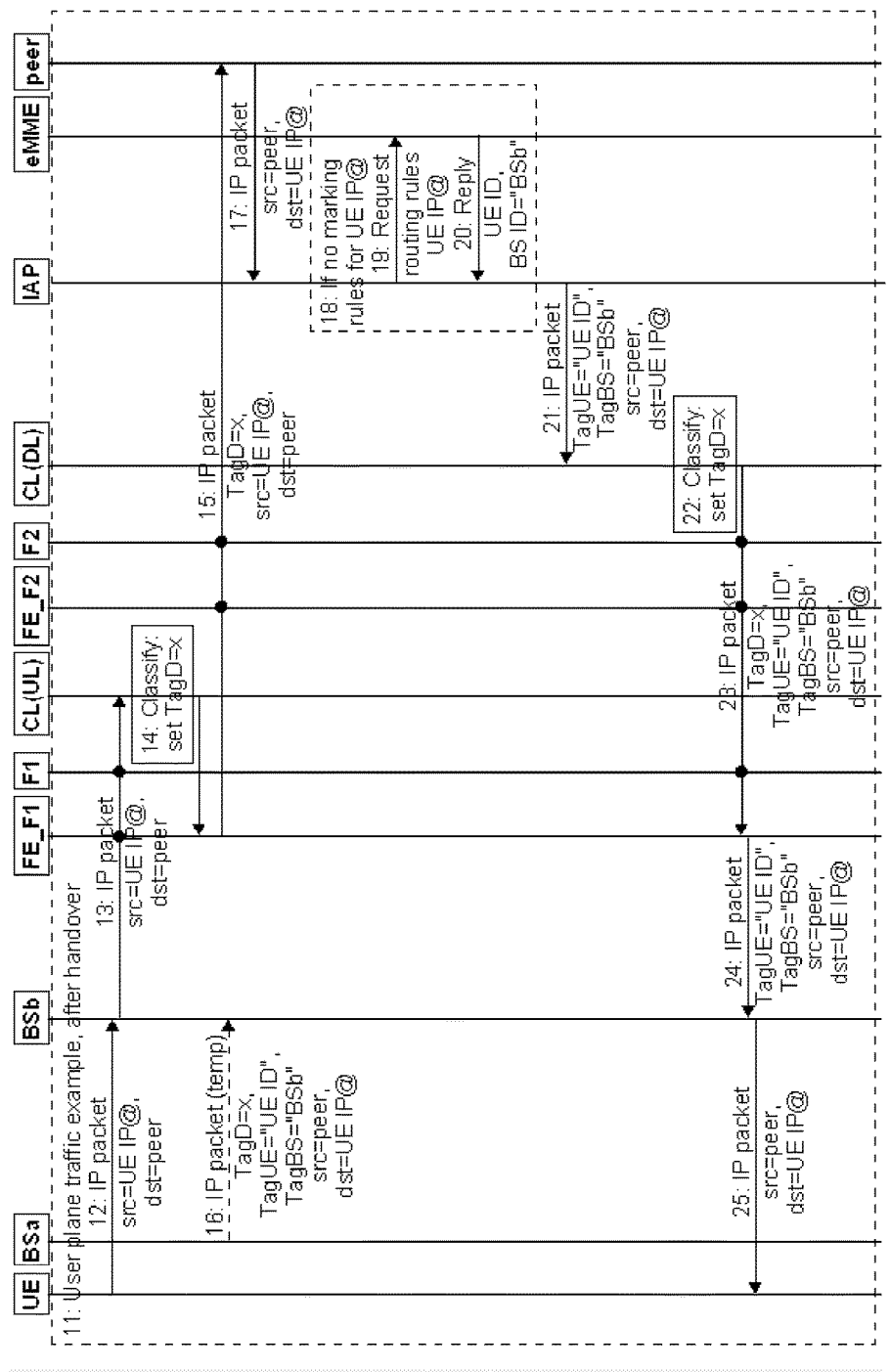

Upon mobility there is no need to re-configure FEs either. FIGS. 12a and 12b visualizes that there is no need for reconfiguration of FEs. Also here, from a UE perspective the handover procedure is the same as in today's EPC. To achieve service chaining mobility, the IAP obtains a new BS ID for the new location of the UE. That new BS ID can then be set as a tag in downlink packets (step 21).

In FIGS. 12a and 12b, no function relocation, i.e. transfer of context, is needed. Even if this would be needed, e.g. when the UE moves from BSa to BSc, there is still no need to re-configure any FE. This is shown in FIG. 13. The relocation (step 13) is described further below.

Figure 13A:
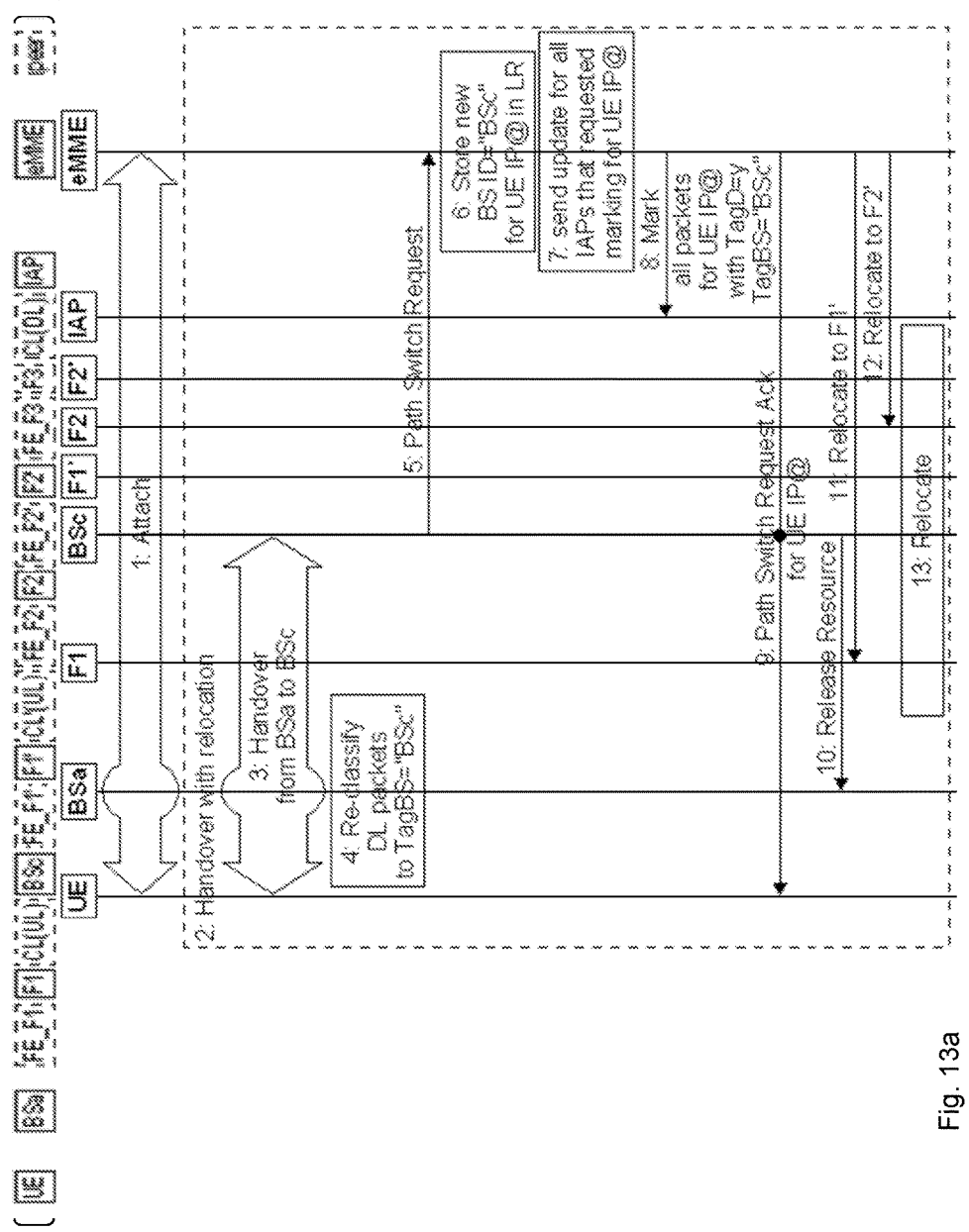
FIGS. 13a and 13b are yet still further combined signaling and flowcharts illustrating a yet still further embodiment herein.
Figure 13B:
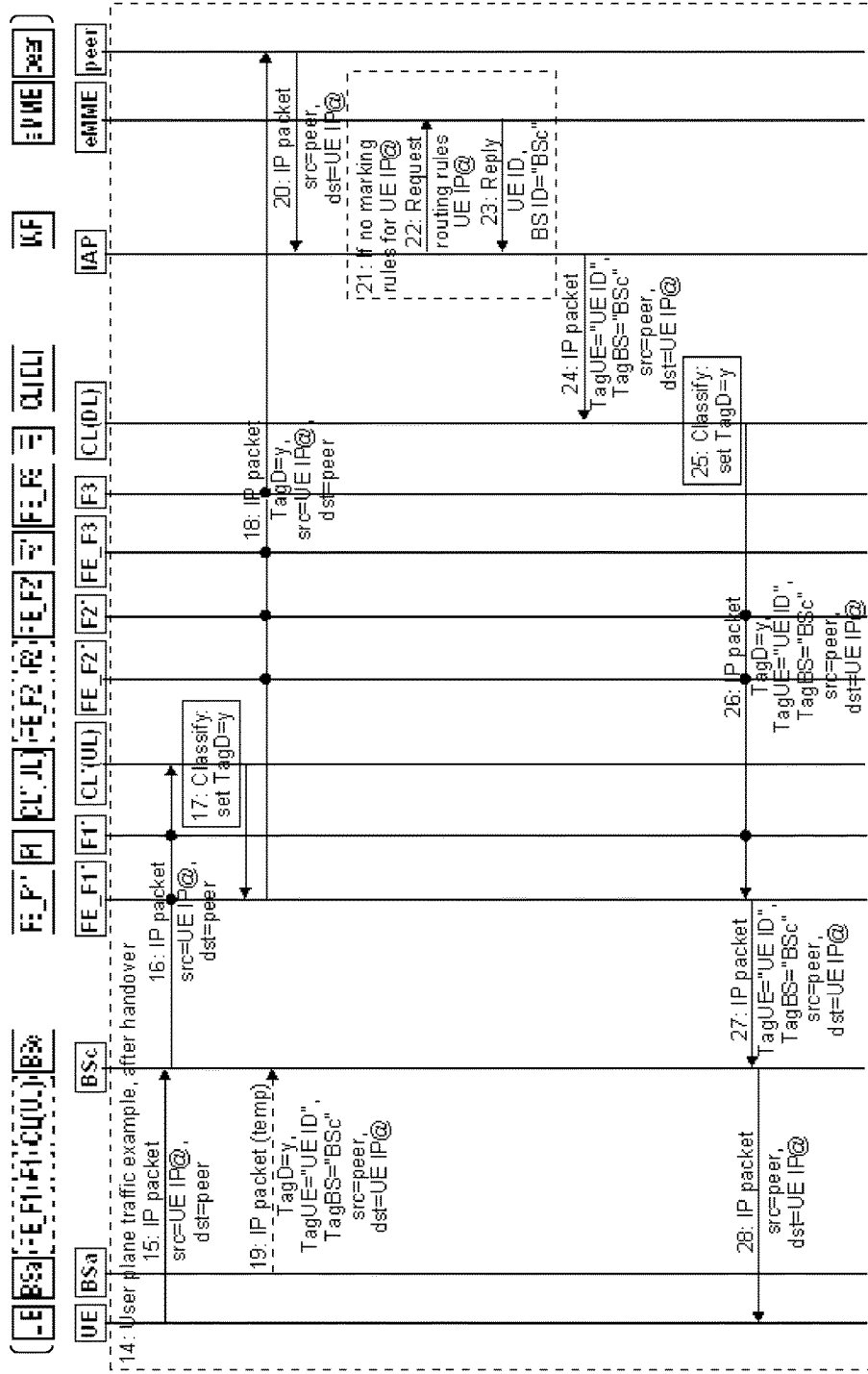

The relocation step 13 of FIGS. 13a and 13b encompasses the copying of user-specific context, also referred to as context of mobile device, from a source instance of a particular function to a target instance of that same function. Context may include user-specific data element like counter, buffers, identifiers, etc. In FIGS. 13a and 13b some elements have been omitted (as indicated by dashed lines) to improve legibility of the Figure.

Further Embodiments

The tag hierarchy above is just one example. Tags could be organized differently. E.g. TagD and TagBS could be combined into a single TagD, where that tag would get a different value for every chain towards a different base station. Such a two-level hierarchy would make the packet header smaller (two tags instead of three tags), but would increase the number of entries of the "TagD" table in the FEs. Exactly which setup of tags to use depends on multiple factors including network topology, size of the network, number of UEs, etc.

Figures 14A, 14B:
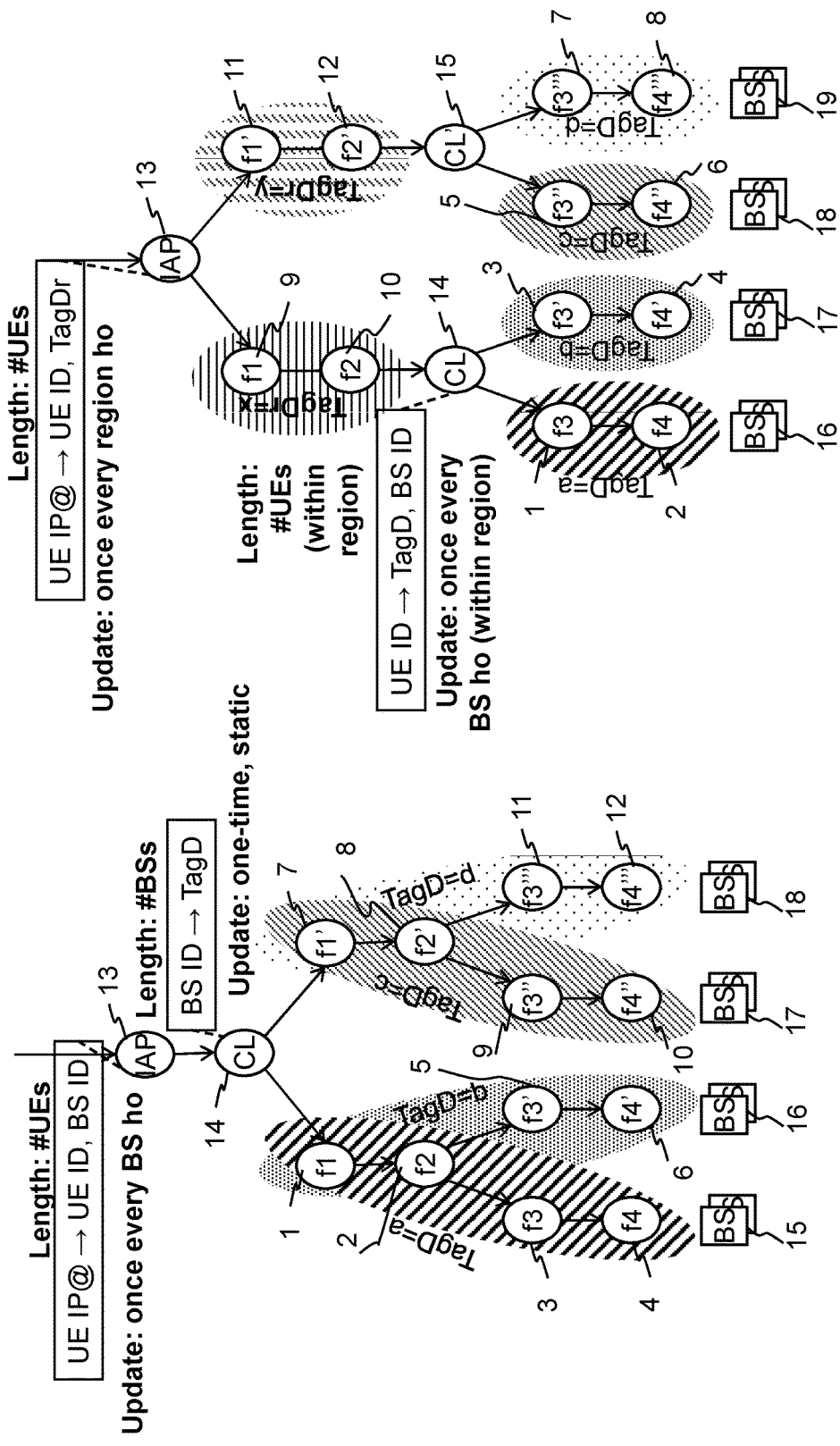
FIGS. 14a and 14b are schematic overviews illustrating two different hierarchies.

FIG. 14a and FIG. 14b compare two different hierarchies. FIG. 14a is similar to the three-level hierarchy shown above. Functions (f1-f4) are represented by function instances 1-12. FIG. 14a also illustrates an IAP 13 and a classifier 14 as well as a number of base stations (BS) 15-18.

In FIG. 14b, TagD only encompasses the functions (f3-f4) 1-8 of the chain. Each of the functions 1-2 has additional instances 3-8. The functions f1-f2 9-12, including their instances, are covered by another tag, TagDr for region. In these embodiments, an IAP 13 doesn't set a tag for the BS ID, but a tag for the region, i.e. the location value indicates the region. Another downlink classifier 14, 15, between f2 and f3 sets TagD. Hence, FIG. 14b shows a four-level hierarchy.

The difference in the hierarchies is, apart from the number of tags to carry in each packet, the length and the update rate of the tables in the FEs and the classifiers. E.g., in FIG. 14a, the IAP table is updated upon every BS-to-BS handover. But in FIG. 14b, the IAP table is only updated upon a BS-to-BS handover between two different regions, e.g. between BS16 and BS18. An handover between BS16 and BS17 or between BS18 and 19 would not require any updating of the IAP table.

Figure 15:
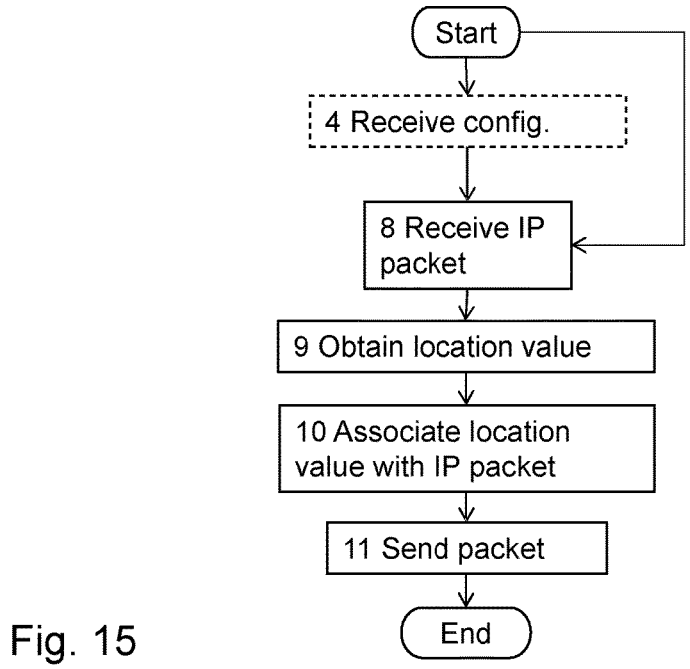
FIG. 15 is a flowchart illustrating embodiments of the method in the entry module.

In FIG. 15, a schematic flowchart of exemplifying methods in the entry module 170 is shown. Again, the same reference numerals as above have been used to denote the same or similar features, in particular the same reference numerals have been used to denote the same or similar actions. Accordingly, the entry module 170 performs a method for managing packets in a communication system 100 based on Software Defined Networking.

As mentioned, the communication system 100 comprises the entry module 170, a radio network node 110, a mobile device 120, a forwarding module 140, a service module 145, a peer device 180 and a management module 147 for managing the forwarding module 140, the service module 145 and the entry module 170, wherein a data plane of the communication system 100 comprises the forwarding module 140, the service module 145 and the entry module 170 and a control plane of the communication system 100 comprises the management module 147, wherein the mobile device 120 is attached to the radio network node 110. The entry module comprises an IAP.

Again, the forwarding module 140 may be configured by the management module 147 with third configuration information, the forwarding module 140 comprising ports towards further forwarding modules and/or the service module 145, wherein the third configuration information specifies to which port a packet, having the location value, is to be forwarded.

One or more of the following actions may be performed in any suitable order.

Action 4

The entry module 170 may receive, from the management module 147 first configuration information indicating the location tag name and location values associated thereto, wherein each location value is associated to a respective radio network node to which the mobile device 120 is capable of attaching.

Action 8

The entry module 170 receives an IP packet from the peer device 180, wherein the IP packet includes a destination IP address associated with the mobile device 120;

Action 9

The entry module 170 obtains, from the management module 147, a location value specifying the radio network node 110 associated with the destination IP address;

Action 10

The entry module 170 associates the location value with the IP packet, wherein the location value is related to a location tag name, indicating the radio network node 110 that serves the mobile device 120, thereby obtaining a packet.

The associating 10 of the location value with the IP packet may comprise generating the packet by encapsulating the IP packet, wherein the packet includes a header comprising the location value and, optionally, the tag name.

The packet may be the IP packet, wherein the associating 10 of the location value with the IP packet may comprise setting the location value as a first option value of the IP packet.

Action 11

The entry module 170 sends the packet, via the forwarding module 140, towards the radio network node 110 as indicated by the location value of the location tag name.

The IP packet may be associated with a flow of IP packets from the peer device 180 to the mobile device 120, wherein at least some other IP packets of the flow are receivable by a further entry module of the communication system 100.

The communication system 100 is anchorless in that the entry module 170 is capable of being one of many entry modules for receiving the IP packet, with the destination IP address, into the communication system 100 from any communication network neighboring thereto.

Figure 16:
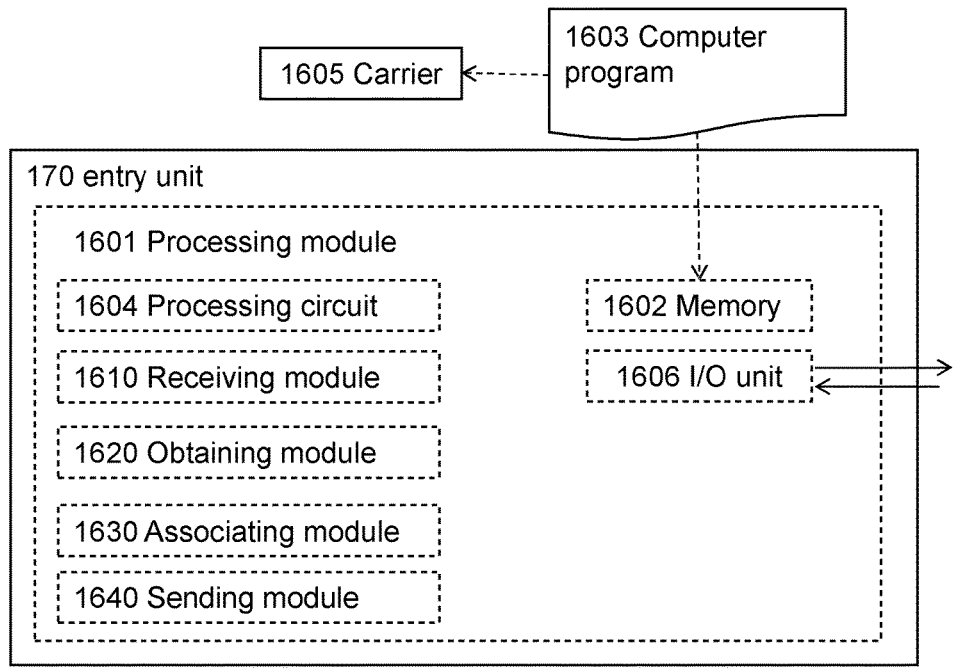
FIG. 16 is a block diagram illustrating embodiments of the entry module.

With reference to FIG. 16, a schematic block diagram of embodiments of the entry module 170 of FIG. 1 is shown. The entry module 170 is thus configured to manage packets in a communication system 100 based on Software Defined Networking.

As mentioned, the communication system 100 comprises the entry module 170, a radio network node 110, a mobile device 120, a forwarding module 140, a service module 145, a peer device 180 and a management module 147 for managing the forwarding module 140, the service module 145 and the entry module 170, wherein a data plane of the communication system 100 comprises the forwarding module 140, the service module 145 and the entry module 170 and a control plane of the communication system 100 comprises the management module 147, wherein the mobile device 120 is attached to the radio network node 110, Again, the entry module 170 may comprise an IAP.

Also again, the IP packet may be associated with a flow of IP packets from the peer device 180 to the mobile device 120, wherein at least some other IP packets of the flow are receivable by a further entry module of the communication system 100.

The communication system 100 may be anchorless in that the entry module 170 is capable of being one of many entry modules for receiving the IP packet, with the destination IP address, into the communication system 100 from any communication network neighboring thereto.

The forwarding module 140 may be configured by the management module 147 with third configuration information, the forwarding module 140 comprising ports towards further forwarding modules and/or the service module 145, wherein the third configuration information specifies to which port a packet, having the location value, is to be forwarded.

The entry module 170 may comprise a processing module 1601, such as a means, one or more hardware modules and/or one or more software modules for performing the methods described herein.

The entry module 170 may further comprise a memory 1602. The memory may comprise, such as contain or store, a computer program 1603.

According to some embodiments herein, the processing module 1601 comprises, e.g. 'is embodied in the form of' or 'realized by', a processing circuit 1604 as an exemplifying hardware module. In these embodiments, the memory 1602 may comprise the computer program 1603, comprising computer readable code modules executable by the processing circuit 1604, whereby the entry module 170 is operative to perform the methods of FIG. 6, and/or FIG. 15.

In some other embodiments, the computer readable code modules may cause the entry module 170 to perform the method according to FIGS. 6 and/or 15 when the computer readable code modules are executed by the entry module 170.

FIG. 16 further illustrates a carrier 1605, or program carrier, which comprises the computer program 1603 as described directly above.

In some embodiments, the processing module 1601 comprises an Input/Output module 1606, which may be exemplified by a receiving module and/or a sending module as described below when applicable.

In further embodiments, the processing module 1601 may comprise one or more of a receiving module 1610, an obtaining module 1620, an associating module 1630, and a sending module 1640 as exemplifying hardware modules. In other examples, one or more of the aforementioned exemplifying hardware modules may be implemented as one or more software modules.

Therefore, according to the various embodiments described above, the entry module 170, the processing module 1601 and/or the receiving module 1610 is operative to, such as configured to, receive an IP packet from the peer device 180, wherein the IP packet includes a destination IP address associated with the mobile device 120.

The entry module 170, the processing module 1601 and/or the obtaining module 1620 is operative to, such as configured to, obtain, from the management module 147, a location value specifying the radio network node 110 associated with the destination IP address.

Moreover, the entry module 170, the processing module 1601 and/or the associating module 1630 is operative to, such as configured to, associate the location value with the IP packet, wherein the location value is related to a location tag name, indicating the radio network node 110 that serves the mobile device 120, thereby obtaining a packet.

The entry module 170, the processing module 1601 and/or the sending module 1640 is further operative to, such as configured to, send the packet, via the forwarding module 140, towards the radio network node 110 as indicated by the location value of the location tag name.

The entry module 170, the processing module 1601 and/or the associating module 1630 may be operative to, such as configured to, associate the location value with the IP packet by generating the packet by encapsulating the IP packet, wherein the packet includes a header comprising the location value and, optionally, the tag name.

In some embodiments, the packet is the IP packet. In these embodiments, the entry module 170, the processing module 1601 and/or the associating module 1630 may be operative to, such as configured to, associate the location value with the IP packet by setting the location value as a first option value of the IP packet.

The entry module 170, the processing module 1601 and/or the receiving module 1610, or a further receiving module, not shown, may be operative to, such as configured to, receive, from the management module 147 first configuration information indicating the location tag name and location values associated thereto, wherein each location value is associated to a respective radio network node to which the mobile device 120 is capable of attaching.

Figure 17:
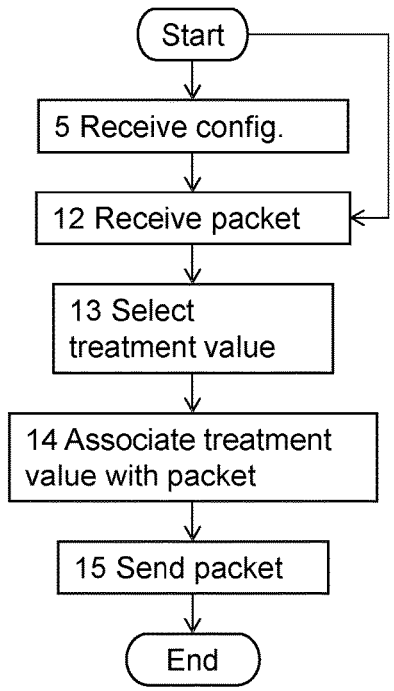
FIG. 17 is a flowchart illustrating embodiments of the method in the downlink module.

In FIG. 17, a schematic flowchart of exemplifying methods in the downlink module 160 is shown. Again, the same reference numerals as above have been used to denote the same or similar features, in particular the same reference numerals have been used to denote the same or similar actions. Accordingly, the downlink module 160 performs a method for managing packets in a communication system 100 based on Software Defined Networking.

As mentioned, the communication system 100 comprises the downlink module 160, a radio network node 110, a mobile device 120, a forwarding module 140, a service module 145, a peer device 180 and a management module 147 for managing the forwarding module 140 and the service module 145, wherein a data plane of the communication system 100 comprises the downlink module 160, the forwarding module 140 and the service module 145 and a control plane of the communication system 100 comprises the management module 147, wherein the mobile device 120 is attached to the radio network node 110.

One or more of the following actions may be performed in any suitable order.

Action 5

The downlink module 160 receives, from the management module 147, second configuration information indicating a treatment tag name, and treatment values.

Action 12

The downlink module 160 receives, via the entry module 170, a packet from the peer device 180.

Action 13

The downlink module 160 selects a treatment value out of the treatment values based on information included in the packet, thereby classifying the packet.

Action 14

The downlink module 160 associates the treatment value with the packet, wherein the treatment value is related to the treatment tag name.

The associating of the treatment value with the packet may comprise generating a downlink classified packet by encapsulating the IP packet, wherein the downlink classified packet includes a header comprising the treatment value and, optionally, the treatment tag name.

The associating 14 of the treatment value with the packet may comprise associating an identity value of the mobile device 120 with a UE tag name by encapsulating the IP packet, wherein the header of the downlink classified packet includes the identity value.

The packet may be an IP packet, wherein the associating 14 of the treatment value with the packet comprises setting the treatment value as a second option value of the IP packet.

The packet may be the IP packet, wherein the destination IP address of the IP packet is used to identify the mobile device 120.

Action 15

The downlink module 160 sends the packet and the associated treatment value, via the forwarding module 140 which performs the treatment of the packet according to the treatment value, towards the radio network node 110.

The treatment of the packet may comprise invoking, by the forwarding module 140, at least one service provided by the service module 145.

The treatment of the packet may specify a rule for how the forwarding module 140 performs forwarding.

Figure 18:
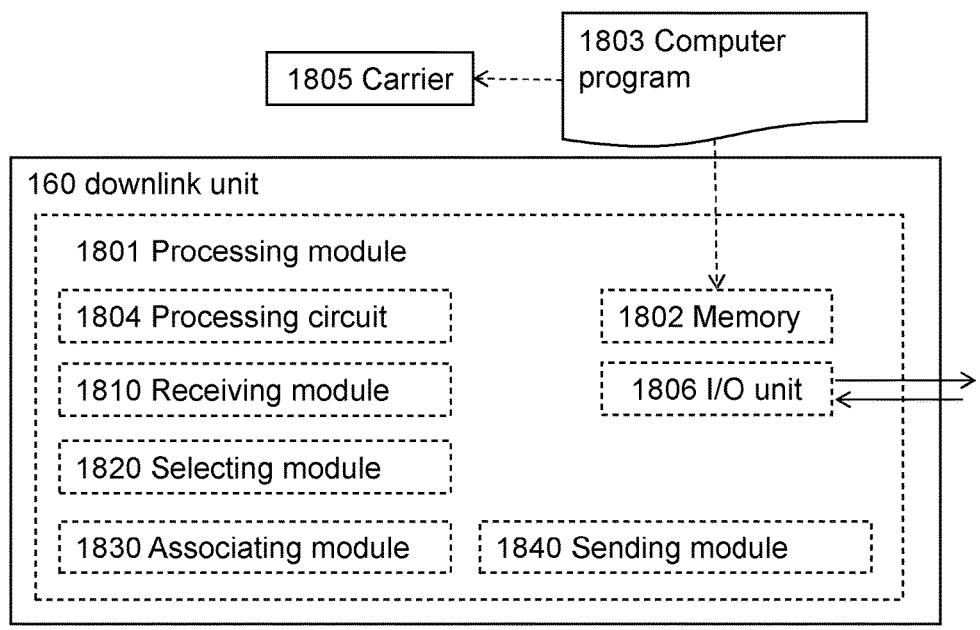
FIG. 18 is a block diagram illustrating embodiments of the downlink module.

With reference to FIG. 18, a schematic block diagram of embodiments of the downlink module 160 of FIG. 1 is shown. The downlink module 160 is thus configured to manage packets in a communication system 100 based on Software Defined Networking.

As mentioned, the communication system 100 comprises the downlink module 160, a radio network node 110, a mobile device 120, a forwarding module 140, a service module 145, a peer device 180 and a management module 147 for managing the forwarding module 140 and the service module 145, wherein a data plane of the communication system 100 comprises the downlink module 160, the forwarding module 140 and the service module 145 and a control plane of the communication system 100 comprises the management module 147, wherein the mobile device 120 is attached to the radio network node 110.

The downlink module 160 may comprise a processing module 1801, such as a means, one or more hardware modules and/or one or more software modules for performing the methods described herein.

The downlink module 160 may further comprise a memory 1802. The memory may comprise, such as contain or store, a computer program 1803.

According to some embodiments herein, the processing module 1801 comprises, e.g. 'is embodied in the form of' or 'realized by', a processing circuit 1804 as an exemplifying hardware module. In these embodiments, the memory 1802 may comprise the computer program 1803, comprising computer readable code modules executable by the processing circuit 1804, whereby the downlink module 160 is operative to perform the methods of FIGS. 6 and/or FIG. 17.

In some other embodiments, the computer readable code modules may cause the downlink module 160 to perform the method according to FIGS. 6 and/or 17 when the computer readable code modules are executed by the downlink module 160.

FIG. 18 further illustrates a carrier 1805, or program carrier, which comprises the computer program 1803 as described directly above.

In some embodiments, the processing module 1801 comprises an Input/Output module 1806, which may be exemplified by a receiving module and/or a sending module as described below when applicable.

In further embodiments, the processing module 1801 may comprise one or more of a receiving module 1810, a selecting module 1820, an associating module 1830, and a sending module 1840 as exemplifying hardware modules. In other examples, one or more of the aforementioned exemplifying hardware modules may be implemented as one or more software modules.

Therefore, according to the various embodiments described above, the downlink module 160, the processing module 1801 and/or the receiving module 1810 is operative to, such as configured to, receive, from the management module 147, second configuration information indicating a treatment tag name, and treatment values, performed by the forwarding module 140, of the packets, and to receive, via the entry module 170, a packet from the peer device 180.

The downlink module 160, the processing module 1801 and/or the selecting module 1820 is operative to, such as configured to, select a treatment value out of the treatment values based on information included in the packet, thereby classifying the packet.

The downlink module 160, the processing module 1801 and/or the associating module 1810 is further operative to, such as configured to, associate the treatment value with the packet, wherein the treatment value is related to the treatment tag name.

Moreover, the downlink module 160, the processing module 1801 and/or the sending module 1840 is operative to, such as configured to, send the packet and the associated treatment value, via the forwarding module 140 which performs the treatment of the downlink classified packet according to the treatment value, towards the radio network node 110.

The treatment of the packet may comprise invoking, by the forwarding module 140, at least one service provided by the user plane module 145.

The treatment of the packet may specify a rule for how the forwarding module 140 performs forwarding.

The downlink module 160, the processing module 1801 and/or the associating module 1810 may further be operative to, such as configured to, associate the treatment value with the packet by generating a downlink classified packet by encapsulating the IP packet, wherein the downlink classified packet includes a header comprising the treatment value and, optionally, the treatment tag name.

The downlink module 160, the processing module 1801 and/or the associating module 1810 may further be operative to, such as configured to, associate the treatment value with the packet by associating an identity value of the mobile device 120 with a UE tag name by encapsulating the IP packet, wherein the header of the downlink classified packet includes the identity value.

The packet may be an IP packet, wherein the downlink module 160, the processing module 1801 and/or the associating module 1810 may further be operative to, such as configured to, associate the treatment value with the packet by setting the treatment value as a second option value of the IP packet.

The packet may be the IP packet, wherein the destination IP address of the IP packet may be used to identify the mobile device 120.

Figure 19:
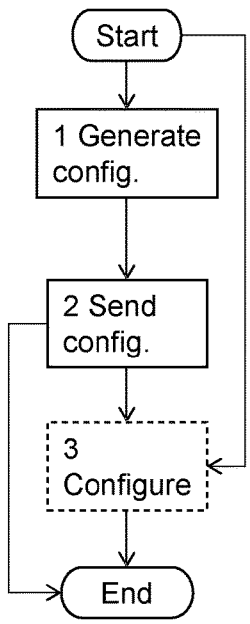
FIG. 19 is a flowchart illustrating embodiments of the method in the management module.

In FIG. 19, a schematic flowchart of exemplifying methods in the management module 147 is shown. Again, the same reference numerals as above have been used to denote the same or similar features, in particular the same reference numerals have been used to denote the same or similar actions. Accordingly, the management module 147 performs a method for managing configuration information in a communication system 100 based on Software Defined Networking.

As mentioned, the communication system 100 comprises an entry module 170, a downlink module 170, a forwarding module 140, and an uplink module 130, wherein a data plane of the communication system 100 comprises the forwarding module 140 and a control plane of the communication system 100 comprises the management module 147.

One or more of the following actions may be performed in any suitable order.

Action 1

The management module 147 generates first configuration information and/or second configuration information, wherein the first configuration information indicates a location tag name and location values, wherein each location value is associated to a respective radio network node to which the mobile device 120 is capable of attaching, and/or the second configuration information indicates a treatment tag name and treatment values and a rule for treatment, performed by the forwarding module 140, of the packets. The rule of the second configuration information may specify how to select a treatment value based on destination IP address and/or source IP address of a packet.

Action 2

The management module 147 sends the first configuration information to the entry module 170 and/or sends the second configuration information to the downlink module 160 and/or the uplink module 130.

Action 3

The management module 147 may configure the forwarding module 140 with third configuration information without triggering by mobility of the mobile device 120, wherein the third configuration information specifies to which port a packet, having a location value of the set of location values, is to be forwarded.

Figure 20:
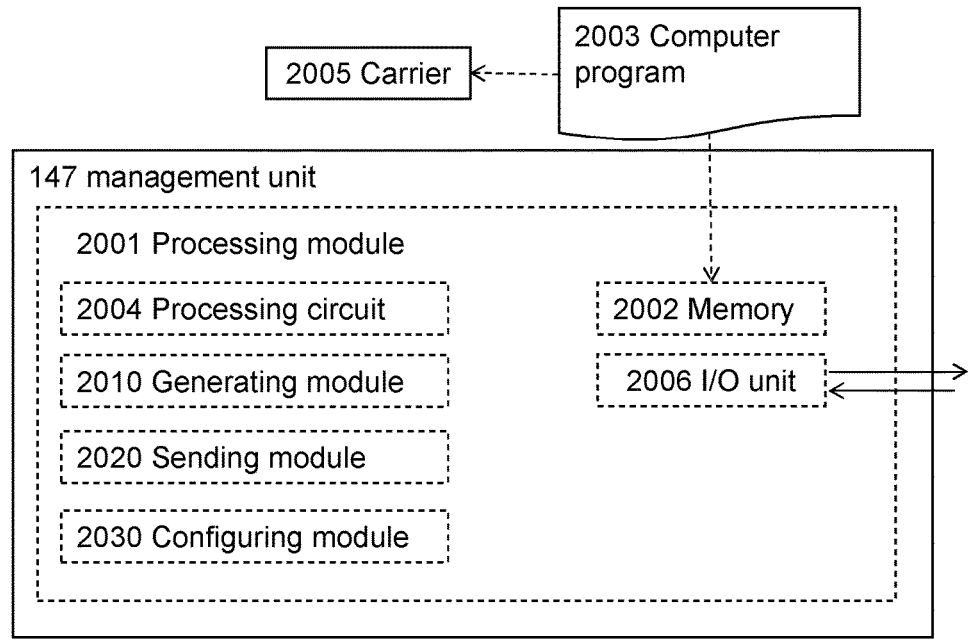
FIG. 20 is a block diagram illustrating embodiments of the management module.

With reference to FIG. 20, a schematic block diagram of embodiments of the management module 147 of FIG. 1 is shown. The management module 147 is thus configured to manage configuration information in a communication system 100 based on Software Defined Networking.

As mentioned, the communication system 100 comprises an entry module 170, a downlink module 170, a forwarding module 140, and an uplink module 130, wherein a data plane of the communication system 100 comprises the forwarding module 140 and a control plane of the communication system 100 comprises the management module 147.

The management module 147 may comprise a processing module 2001, such as a means, one or more hardware modules and/or one or more software modules for performing the methods described herein.

The management module 147 may further comprise a memory 2002. The memory may comprise, such as contain or store, a computer program 2003.

According to some embodiments herein, the processing module 2001 comprises, e.g. 'is embodied in the form of' or 'realized by', a processing circuit 2004 as an exemplifying hardware module. In these embodiments, the memory 2002 may comprise the computer program 2003, comprising computer readable code modules executable by the processing circuit 2004, whereby the management module 147 is operative to perform the methods of FIGS. 6 and/or FIG. 19.

In some other embodiments, the computer readable code modules may cause the management module 147 to perform the method according to FIGS. 6 and/or 19 when the computer readable code modules are executed by the management module 147.

FIG. 20 further illustrates a carrier 2005, or program carrier, which comprises the computer program 2003 as described directly above.

In some embodiments, the processing module 2001 comprises an Input/Output module 2006, which may be exemplified by a receiving module and/or a sending module as described below when applicable.

In further embodiments, the processing module 2001 may comprise one or more of a generating module 2010, a sending module 2020, and a configuring module 2030 as exemplifying hardware modules. In other examples, one or more of the aforementioned exemplifying hardware modules may be implemented as one or more software modules.

Therefore, according to the various embodiments described above, the management module 147, the processing module 2001 and/or the generating module 2010 is operative to, such as configured to, generate first configuration information and/or second configuration information, wherein the first configuration information indicates a location tag name and location values, wherein each location value is associated to a respective radio network node to which the mobile device 120 is capable of attaching, and/or the second configuration information indicates a treatment tag name and treatment values and a rule for treatment, performed by the forwarding module 140, of the packets.

The management module 147, the processing module 2001 and/or the sending module 2020 is operative to, such as configured to, send the first configuration information to the entry module 170 and/or to send the second configuration information to the downlink module 160 and/or the uplink module 130.

The rule of the second configuration information may specify how to select a treatment value based on destination IP address and/or source IP address of a packet.

Moreover, the management module 147, the processing module 2001 and/or the configuring module 2030 is operative to, such as configured to, configure the forwarding module 140 with third configuration information without triggering by mobility of the mobile device 120, wherein the third configuration information specifies to which port a packet, having a location value of the set of location values, is to be forwarded.

Figure 21:
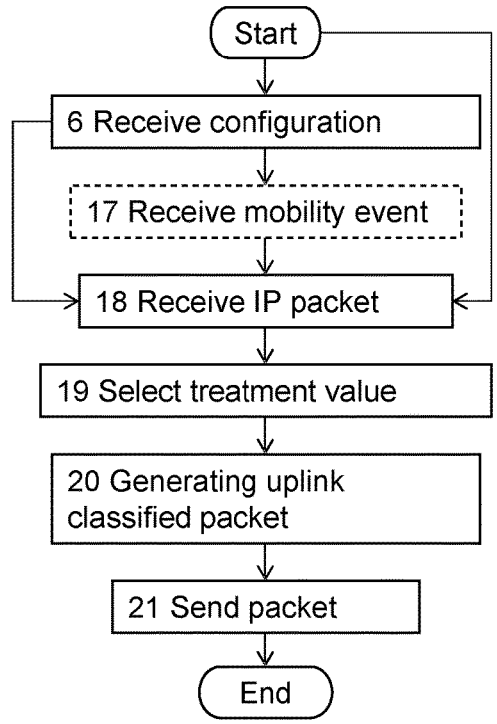
FIG. 21 is a flowchart illustrating embodiments of the method in the uplink module.

In FIG. 21, a schematic flowchart of exemplifying methods in the uplink module 130 is shown. Again, the same reference numerals as above have been used to denote the same or similar features, in particular the same reference numerals have been used to denote the same or similar actions. Accordingly, the uplink module 130 performs a method for managing packets in a communication system 100 based on Software Defined Networking.

As mentioned, the communication system 100 comprises the uplink module 130, a radio network node 110, a mobile device 120, a forwarding module 140, a service module 145, a peer device 180 and a management module 147 for managing the forwarding module 140 and the service module 145, wherein a data plane of the communication system 100 comprises the uplink module 130, the forwarding module 140 and the service module 145 and a control plane of the communication system 100 comprises the management module 147, wherein the mobile device 120 is attached to the radio network node 110.

One or more of the following actions may be performed in any suitable order.

Action 6

The uplink module 130 receives, from the management module 147, second configuration information indicating a treatment tag name, and treatment values.

Action 18

The uplink module 130 receives, via the radio network node 110, an IP packet from the mobile device 120.

Action 19

The uplink module 130 selects a treatment value out of the treatment values based on information included in the packet, thereby classifying the IP packet.

Action 20

The uplink module 130 generates an uplink classified packet encapsulating the treatment value and the IP packet, wherein the treatment value is related to the treatment tag name.

The generating 20 of the uplink classified packet comprises further encapsulating an identity value of the peer device 180 with an identity tag name into the uplink classified packet.

Action 21

The uplink module 130 sends the uplink classified packet, via the forwarding module 140 which performs the treatment of the uplink classified packet according to the treatment value, towards the peer device 180.

The treatment of the packet may comprise invoking, by the forwarding module 140, at least one service provided by the user plane module 145.

The treatment of the packet may specify a rule for how the forwarding module 140 performs forwarding.

Figure 22:
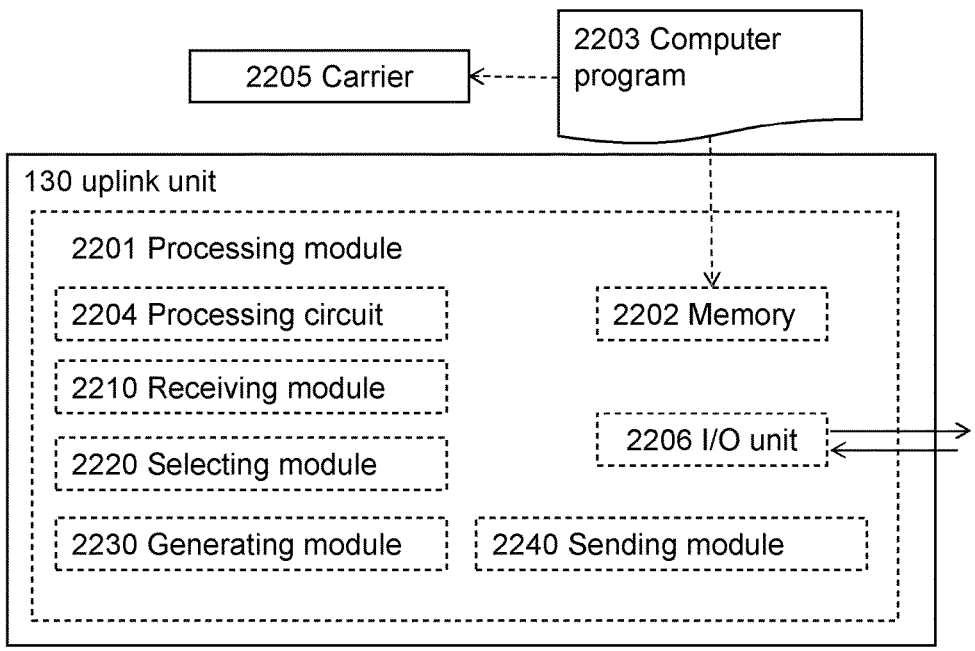
FIG. 22 is a block diagram illustrating embodiments of the uplink module.

With reference to FIG. 22, a schematic block diagram of embodiments of the uplink module 130 of FIG. 1 is shown. The uplink module 130 is thus configured to manage packets in a communication system 100 based on Software Defined Networking.

As mentioned, the communication system 100 comprises the uplink module 130, a radio network node 110, a mobile device 120, a forwarding module 140, a service module 145, a peer device 180 and a management module 147 for managing the forwarding module 140 and the service module 145, wherein a data plane of the communication system 100 comprises the uplink module 130, the forwarding module 140 and the service module 145 and a control plane of the communication system 100 comprises the management module 147, wherein the mobile device 120 is attached to the radio network node 110.

The uplink module 130 may comprise a processing module 2201, such as a means, one or more hardware modules and/or one or more software modules for performing the methods described herein.

The uplink module 130 may further comprise a memory 2202. The memory may comprise, such as contain or store, a computer program 2203.

According to some embodiments herein, the processing module 2201 comprises, e.g. 'is embodied in the form' of or 'realized by', a processing circuit 2204 as an exemplifying hardware module. In these embodiments, the memory 2202 may comprise the computer program 2203, comprising computer readable code modules executable by the processing circuit 2204, whereby the uplink module 130 is operative to perform the methods of FIGS. 6 and/or FIG. 21.

In some other embodiments, the computer readable code modules may cause the uplink module 130 to perform the method according to FIGS. 6 and/or 21 when the computer readable code modules are executed by the uplink module 130.

FIG. 22 further illustrates a carrier 2205, or program carrier, which comprises the computer program 2203 as described directly above.

In some embodiments, the processing module 2201 comprises an Input/Output module 2206, which may be exemplified by a receiving module and/or a sending module as described below when applicable.

In further embodiments, the processing module 2201 may comprise one or more of a receiving module 2210, a selecting module 2220, a generating module 2230, and a sending module 2240 as exemplifying hardware modules. In other examples, one or more of the aforementioned exemplifying hardware modules may be implemented as one or more software modules.

Therefore, according to the various embodiments described above, the uplink module 130, the processing module 2201 and/or the receiving module 2210 is operative to, such as configured to, receive, from the management module 147, second configuration information indicating a treatment tag name, and treatment values.

The uplink module 130, the processing module 2201 and/or the receiving module 2210 is operative to, such as configured to, receive, via the radio network node 110, an IP packet from the mobile device 120.

The uplink module 130, the processing module 2201 and/or the selecting module 2220 is operative to, such as configured to, select a treatment value out of the treatment values based on information included in the packet, thereby classifying the IP packet.

The uplink module 130, the processing module 2201 and/or the generating module 2230 is operative to, such as configured to, generate an uplink classified packet encapsulating the treatment value and the IP packet, wherein the treatment value is related to the treatment tag name.

The uplink module 130, the processing module 2201 and/or the sending module 2240 is operative to, such as configured to, send the uplink classified packet, via the forwarding module 140 which performs the treatment of the uplink classified packet according to the treatment value, towards the peer device 180.

The treatment of the packet may comprise invoking, by the forwarding module 140, at least one service provided by the user plane module 145.

The treatment of the packet may specify a rule for how the forwarding module 140 performs forwarding.

The uplink module 130, the processing module 2201 and/or the generating module 2230 may be operative to, such as configured to, generate the uplink classified packet by further encapsulating an identity value of the peer device 180 with an identity tag name into the uplink classified packet.

As used herein, the term "node", or "network node", may refer to one or more physical entities, such as devices, apparatuses, computers, servers or the like. This may mean that embodiments herein may be implemented in one physical entity. Alternatively, the embodiments herein may be implemented in a plurality of physical entities, such as an arrangement comprising said one or more physical entities, i.e. the embodiments may be implemented in a distributed manner.

As used herein, the term "unit" may refer to one or more functional units, each of which may be implemented as one or more hardware modules and/or one or more software modules in a node. Thus, the term "module" corresponds to the term "unit", since one or more software/hardware modules may implement a "unit".

As used herein, the term "program carrier" may refer to one of an electronic signal, an optical signal, a radio signal, and a computer readable medium. In some examples, the program carrier may exclude transitory, propagating signals, such as the electronic, optical and/or radio signal. Thus, in these examples, the carrier may be a non-transitory carrier, such as a non-transitory computer readable medium.

As used herein, the term "processing module" may include one or more hardware modules, one or more software modules or a combination thereof. Any such module, be it a hardware, software or a combined hardware-software module, may be a determining means, estimating means, capturing means, associating means, comparing means, identification means, selecting means, receiving means, sending means or the like as disclosed herein. As an example, the expression "means" may be a module corresponding to the modules listed above in conjunction with the Figures.

As used herein, the term "software module" may refer to a software application, a Dynamic Link Library (DLL), a software component, a software object, an object according to Component Object Model (COM), a software component, a software function, a software engine, an executable binary software file or the like.

As used herein, the term "processing circuit" may refer to a processing unit, a processor, an Application Specific integrated Circuit (ASIC), a Field-Programmable Gate Array (FPGA) or the like. The processing circuit or the like may comprise one or more processor kernels.

As used herein, the expression "configured to" may mean that a processing circuit is configured to, or adapted to, by means of software configuration and/or hardware configuration, perform one or more of the actions described herein.

As used herein, the term "memory" may refer to a hard disk, a magnetic storage medium, a portable computer diskette or disc, flash memory, random access memory (RAM) or the like. Furthermore, the term "memory" may refer to an internal register memory of a processor or the like.

As used herein, the term "computer readable medium" may be a Universal Serial Bus (USB) memory, a DVD-disc, a Blu-ray disc, a software module that is received as a stream of data, a Flash memory, a hard drive, a memory card, such as a MemoryStick, a Multimedia Card (MMC), Secure Digital (SD) card, etc.

As used herein, the term "computer readable code units" may be text of a computer program, parts of or an entire binary file representing a computer program in a compiled format or anything there between.

As used herein, the term "radio resource" may refer to a certain coding of a signal and/or a time frame and/or a frequency range in which the signal is transmitted. In some examples, a resource may refer to one or more Physical Resource Blocks (PRB) which is used when transmitting the signal. In more detail, a PRB may be in the form of Orthogonal Frequency Division Multiplexing (OFDM) PHY resource blocks (PRB). The term "physical resource block" is known from 3GPP terminology relating to e.g. Long Term Evolution Systems.

As used herein, the terms "number" and/or "value" may be any kind of digit, such as binary, real, imaginary or rational number or the like. Moreover, "number" and/or "value" may be one or more characters, such as a letter or a string of letters. "Number" and/or "value" may also be represented by a bit string.

As used herein, the term "set of" may refer to one or more of something. E.g. a set of devices may refer to one or more devices, a set of parameters may refer to one or more parameters or the like according to the embodiments herein.

As used herein, the expression "in some embodiments" has been used to indicate that the features of the embodiment described may be combined with any other embodiment disclosed herein.

Even though embodiments of the various aspects have been described, many different alterations, modifications and the like thereof will become apparent for those skilled in the art. The described embodiments are therefore not intended to limit the scope of the present disclosure.

Annex 1—Source Script for Msc-Generator http://mcs-generatorsourceforge.net/

This can be used in case text of FIGS. 7-10 is difficult to read.

FIG. 10:

```
msc=Dinand {
background.color=white;
defstyle pipe [solid=0];
UE [label="\bUE"],
BS [label="\bBS"],
CL [label="\bCL(UL)"],
F2 [label="\bF2"],
F3 [label="\bF3"],
F4 [label="\bF4"],
CLd [label="\bCL(DL)"],
IAP [label="\bIAP"],
eMME [label="\beMME"],
peer [label="\bpeer"];
++: User plane traffic example [lgreen] {
    UE->BS: IP packet\n\-src=UE IP@, dst=peer [color=blue];
    BS->CL: IP packet\n\-src=UE IP@, dst=peer [color=blue];
    CL--CL: Classify:\nset TagD=x [lgreen];
    CL->F2-F4: IP packet\-
                TagD=x
                src=UE IP@, dst=peer [color=blue];
    F4->peer: IP packet\-
                src=UE IP@, dst=peer [color=blue];
    peer->IAP: IP packet\n\-src=peer, dst=UE IP@ [color=red];
    ++: If no cached marking rules for UE IP@ [lgreen] {
        IAP->eMME: Request markings\n\-UE IP@;
        eMME->IAP: Reply\n\-UE ID, BS ID;
    };
    IAP->CLd: IP packet\n\-TagUE="UE ID", TagBS="BS
ID"\nsrc=peer, dst=UE IP@ [color=red];
    CLd--CLd: Classify:
                set TagD=x [lgreen];
    CLd->F4-F2: IP packet\n\-TagD=x, TagUE="UE ID", TagBS="BS
ID"\nsrc=peer, dst=UE IP@ [color=red];
    F2->BS: IP packet\-
                TagUE="UE ID", TagBS="BS ID"
                src=peer, dst=UE IP@ [color=red];
    BS->UE: IP packet\n\-src=peer, dst=UE IP@ [color=red];
};
}
```

FIG. 11:

```
msc=Dinand {
background.color=white;
defstyle pipe [solid=0];
UE [label="\bUE"],
BS [label="\bBS"],
CL [label="\bCL(UL)"],
FE_F2 [label="\bFE_F2"],
F2 [label="\bF2"],
FE_F3 [label="\bFE_F3"],
F3 [label="\bF3"],
FE_F4 [label="\bFE_F4"],
F4 [label="\bF4"],
CLd [label="\bCL(DL)"],
IAP [label="\bIAP"],
eMME [label="\beMME"],
peer [label="\bpeer"];
++: Pre-attach [lyellow] {
    eMME->CL: Classifier rules\n\-Mark all traffic to Internet with
TagD=x;
    eMME->CLd: Classifier rules\n\-Mark all traffic from Internet with
TagD=x;
    eMME->FE_F2: Forwarding rules\-
        TagD=x: UL to FE_F3 via F2, DL to FE_F1 via F2;
    eMME->FE_F3: Forwarding rules\-
        TagP=z: UL to FE_F4 via F3, DL to FE_F2 via F3
        TagD=x: UL to FE_F4, DL to FE_F2;
    eMME->FE_F4: Forwarding rules\-
        TagD=x: UL to Internet via F4, DL to FE_F3 via F4;
};
++: Initial attach [lyellow] {
    UE->BS: Attach Request;
    BS->eMME: Attach Request\n\-UE ID, BS ID;
    eMME--eMME: \-Assign IP@/prefix\nto this UE [color=lyellow];
    eMME--eMME: \-Assign\nservice chain(s)\nfor this UE
```
[color=lyellow];
```
    eMME--eMME: \-Store UE IP@/prefix\nand UE ID\nand BS ID\nin
LR [color=lyellow];
    eMME->BS-UE: Attach Accept\n\-IP@/prefix;
};
}
```

FIG. 12:

```
msc=Dinand {
background.color=white;
defstyle pipe [solid=0];
UE [label="\bUE"],
BSa [label="\bBSa"],
BSb [label="\bBSb"],
FE_F1 [label="\bFE_F1"],
F1 [label="\bF1"],
CL [label="\bCL(UL)"],
FE_F2 [label="\bFE_F2"],
F2 [label="\bF2"],
CLd [label="\bCL(DL)"],
IAP [label="\bIAP"],
eMME [label="\beMME"],
peer [label="\bpeer"];
block UE<->BSa-eMME: Attach [lyellow];
++: Handover without relocation [lyellow] {
    block UE<->BSa-BSb: Handover from BSa to BSb[lyellow];
    BSa--BSa: \-Re-classify DL packets to TagBS="BSb" [lyellow];
    BSb->eMME: Path Switch Request;
    eMME--eMME: \-Store new BSb ID
                for UE IP@ in LR [lyellow];
    eMME--eMME: \-send update for all
                IAPs that requested
                marking for UE IP@ [lyellow];
    eMME->IAP: Mark all packets for UE IP@
                \-with TagBS="BSb";
    eMME->BSb-UE: Path Switch Request Ack
                -for UE IP@;
    BSb->BSa: Release Resource;
};
++: User plane traffic example, after handover [lgreen] {
    UE->BSb: IP packet\n\-src=UE IP@, dst=peer [color=blue];
    BSb->FE_F1-F1-CL: IP packet\n\-src=UE IP@, dst=peer
[color=blue];
    CL--CL: \-Classify:
                set TagD=x [lgreen];
    CL->FE_F1 [color=blue];
    FE_F1->FE_F2-F2-peer: IP packet
                \-TagD=x, src=UE IP@, dst=peer [color=blue];
    BSa>>BSb: IP packet (temporary)
                \-TagD=x, TagUE="UE ID", TagBS="BSb"
                src=peer, dst=UE IP@ [color=red];
    peer->IAP: IP packet
                \-src=peer, dst=UE IP@ [color=red];
    ++: If no marking rules for UE IP@[lgreen] {
        IAP->eMME: Request routing rules\n\-UE IP@;
        eMME->IAP: Reply\n\-UE ID, BS ID="BSb";
    };
    IAP->CLd: IP packet
                \-TagUE="UE ID", TagBS="BSb"
                src=peer, dst=UE IP@ [color=red];
    CLd--CLd: \-Classify: setTagD=x [lgreen];
    CLd->F2-FE_F2-F1-FE_F1: IP packet
                \-TagD=x, TagUE="UE ID", TagBS="BSb"
                src=peer, dst=UE IP@ [color=red];
    FE_F1->BSb: IP packet\n\-TagUE="UE ID", TagBS="BSb"
                src=peer, dst=UE IP@ [color=red];
    BSb->UE: IP packet\n\-src=peer, dst=UE IP@ [color=red];
};
}
```

FIG. 13:

```
msc=Dinand {
background.color=white;
```

-continued

```
defstyle pipe [solid=0];
UE [label="\bUE"],
BSa [label="\bBSa"],
FE_F1 [label="\bFE_F1"],
F1[label="\bF1"],
CL [label="\bCL(UL)"],
BSc [label="\bBSc"],
FE_F1p [label="\bFE_F1'"],
F1p[label="\bF1'"],
CLp [label="\bCL'(UL)"],
FE_F2 [label="\bFE_F2"],
F2[label="\bF2"],
FE_F2p [label="\bFE_F2'"],
F2p[label="\bF2'"],
FE_F3 [label="\bFE_F3"],
F3[label="\bF3"],
CLd [label="\bCL(DL)"],
IAP [label="\bIAP"],
eMME [label="\beMME"],
peer [label="\bpeer"];
block UE<->BSa-eMME: Attach [lyellow];
++: Handover with relocation [lyellow] {
    block UE<->BSa-BSc: Handover from BSa to BSc[lyellow];
    BSa--BSa: \-Re-classify DL packets to TagBS="BSc" [lyellow];
    BSc->eMME: Path Switch Request;
    eMME--eMME: \-Store new BS ID="BSc"
        for UE IP@ in LR [lyellow];
    eMME--eMME: \-send update for all
        IAPs that requested
        marking for UE IP@ [lyellow];
    eMME->IAP: Mark all packets for UE IP@
        \-with TagD=y TagBS="BSc";
    eMME->BSc-UE: Path Switch Request Ack
        \-for UE IP@;
    BSc->BSa: Release Resource;
        eMME->F1: Relocate to F1';
        eMME->F2: Relocate to F2';
    F1-F2p: Relocate [lyellow];
};
++: User plane traffic example, after handover [lgreen] {
    UE->BSc: IP packet\n\-src=UE IP@, dst=peer [color=blue];
    BSc->FE_F1p-F1p-CLp: IP packet\n\-src=UE IP@, dst=peer
    [color=blue];
    CLp--CLp: \-Classify:
        set TagD=y [lgreen];
    CLp->FE_F1p [color=blue];
    FE_F1p->FE_F2p-F2p-FE_F3-F3-peer: IP packet
        \-TagD=y, src=UE IP@, dst=peer [color=blue];
    BSa>>BSc: IP packet (temporary)
        \-TagD=y, TagUE="UE ID", TagBS="BSc"
        src=peer, dst=UE IP@ [color=red];
    peer->IAP: IP packet
        \-src=peer, dst=UE IP@ [color=red];
    ++: If no marking rules for UE IP@[lgreen] {
        IAP->eMME: Request routing rules\n\-UE IP@;
        eMME->IAP: Reply\n\-UE ID, BS ID="BSc";
    };
    IAP->CLd: IP packet
        \-TagUE="UE ID", TagBS="BSc"
        src=peer, dst=UE IP@ [color=red];
    CLd--CLd: \-Classify: setTagD=y [lgreen];
    CLd->F2p-FE_F2p-F1p-FE_F1p: IP packet
        \-TagD=y, TagUE="UE ID", TagBS="BSc"
        src=peer, dst=UE IP@ [color=red];
    FE_F1p->BSc: IP packet\n\-TagUE="UE ID", TagBS="BSc"
        src=peer, dst=UE IP@ [color=red];
    BSc->UE: IP packet\n\-src=peer, dst=UE IP@ [color=red];
};
}
```

The invention claimed is:

1. A method, performed by an entry module, for managing packets in a communication system based on Software Defined Networking, wherein the communication system comprises the entry module, a radio network node, a mobile device, a forwarding module, a service module, a peer device and a management module for managing the forwarding module, the service module and the entry module, wherein a data plane of the communication system comprises the forwarding module, the service module and the entry module and a control plane of the communication system comprises the management module, wherein the mobile device is attached to the radio network node, wherein the method comprises:
receiving an Internet Protocol (IP) packet from the peer device, wherein the IP packet includes a destination IP address associated with the mobile device;
obtaining, from the management module, a location value specifying the radio network node associated with the destination IP address;
associating the location value with the IP packet, wherein the location value is related to a location tag name, indicating the radio network node that serves the mobile device, thereby obtaining a packet; and
sending the packet, via the forwarding module, towards the radio network node as indicated by the location value of the location tag name.

2. The method of claim 1, wherein the IP packet is associated with a flow of IP packets from the peer device to the mobile device, wherein at least some other IP packets of the flow are receivable by a further entry module of the communication system.

3. The method of claim 1, wherein the communication system is anchorless in that the entry module is capable of being one of many entry modules for receiving the IP packet, with the destination IP address, into the communication system from any communication network neighboring thereto.

4. The method of claim 1, wherein the associating of the location value with the IP packet comprises generating the packet by encapsulating the IP packet, wherein the packet includes a header comprising the location value.

5. The method of claim 1, wherein the packet is the IP packet, wherein the associating of the location value with the IP packet comprises setting the location value as a first option value of the IP packet.

6. The method of claim 1, wherein the method comprises:
receiving, from the management module first configuration information indicating the location tag name and location values associated thereto, wherein each location value is associated to a respective radio network node to which the mobile device is capable of attaching.

7. The method of claim 1, wherein the entry module comprises an Internet Protocol Advertisement Point.

8. A method, performed by a downlink module, for managing packets in a communication system based on Software Defined Networking, wherein the communication system comprises the downlink module, a radio network node, a mobile device, a forwarding module, a service module, a peer device and a management module for managing the forwarding module and the service module, wherein a data plane of the communication system comprises the downlink module, the forwarding module and the service module and a control plane of the communication system comprises the management module, wherein the mobile device is attached to the radio network node, wherein the method comprises:
receiving, from the management module, second configuration information indicating a treatment tag name, and treatment values;
receiving, via the entry module, a packet from the peer device;

selecting a treatment value out of the treatment values based on information included in the packet, thereby classifying the packet;

associating the treatment value with the packet, wherein the treatment value is related to the treatment tag name; and sending the packet and the associated treatment value, via the forwarding module which performs a treatment of the packet according to the treatment value, towards the radio network node.

9. The method of claim 8, wherein the associating of the treatment value with the packet comprises generating a downlink classified packet by encapsulating the packet, wherein the downlink classified packet includes a header comprising the treatment value.

10. The method of claim 9, wherein the associating of the treatment value with the packet comprises associating an identity value of the mobile device with a device tag name by encapsulating the packet, wherein the header of the downlink classified packet includes the identity value.

11. The method of claim 8, wherein the packet is an IP packet, wherein the associating of the treatment value with the packet comprises setting the treatment value as a second option value of the IP packet.

12. The method of claim 8, wherein the packet is an IP packet, wherein the destination IP address of the IP packet is used to identify the mobile device.

13. A method, performed by a management module, for managing configuration information in a communication system based on Software Defined Networking, wherein the communication system comprises an entry module, a downlink module, a forwarding module, and an uplink module, wherein a data plane of the communication system comprises the forwarding module and a control plane of the communication system comprises the management module, wherein the method comprises:

generating first configuration information and/or second configuration information, wherein the first configuration information indicates a location tag name and location values, wherein each location value is associated to a respective radio network node to which the mobile device is capable of attaching, and/or the second configuration information indicates a treatment tag name and treatment values and a rule for treatment, performed by the forwarding module, of the packets; and sending the first configuration information to the entry module and/or sending the second configuration information to the downlink module and/or the uplink module.

14. The method of claim 13, wherein the method comprises:

configuring the forwarding module with third configuration information without triggering by mobility of the mobile device, wherein the third configuration information specifies to which port a packet, having a location value of the set of location values, is to be forwarded.

15. The method of claim 13, wherein the rule of the second configuration information specifies how to select a treatment value based on destination IP address and/or source IP address of a packet.

16. A method, performed by an uplink module, for managing packets in a communication system based on Software Defined Networking, wherein the communication system comprises the uplink module, a radio network node, a mobile device, a forwarding module, a service module, a peer device and a management module for managing the forwarding module and the service module, wherein a data plane of the communication system comprises the uplink module, the forwarding module and the service module and a control plane of the communication system comprises the management module, wherein the mobile device is attached to the radio network node, wherein the method comprises:

receiving, from the management module, second configuration information indicating a treatment tag name, and treatment values;

receiving, via the radio network node, an IP packet from the mobile device;

selecting a treatment value out of the treatment values based on information included in the packet, thereby classifying the IP packet;

generating an uplink classified packet encapsulating the treatment value and the IP packet, wherein the treatment value is related to the treatment tag name; and sending the uplink classified packet, via the forwarding module which performs a treatment of the uplink classified packet according to the treatment value, towards the peer device.

17. The method of claim 16, wherein the generating of the uplink classified packet comprises further encapsulating an identity value of the peer device with an identity tag name into the uplink classified packet.

18. An entry module configured to manage packets in a communication system based on Software Defined Networking, wherein the communication system comprises the entry module, a radio network node, a mobile device, a forwarding module, a service module, a peer device and a management module for managing the forwarding module, the service module and the entry module, wherein a data plane of the communication system comprises the forwarding module, the service module and the entry module and a control plane of the communication system comprises the management module, wherein the mobile device is attached to the radio network node, the entry module comprising:

an input/output circuit configured to send and receive packets;

a processing circuit operatively coupled to the input/output circuit;

and a memory circuit operatively coupled to the processing circuit and storing program instructions for execution by the processing circuit, the program instructions being configured to cause the entry module to:

receive an Internet Protocol (IP) packet from the peer device, wherein the IP packet includes a destination IP address associated with the mobile device;

obtain, from the management module, a location value specifying the radio network node associated with the destination IP address;

associate the location value with the IP packet, wherein the location value is related to a location tag name, indicating the radio network node that serves the mobile device, thereby obtaining a packet; and send the packet, via the forwarding module, towards the radio network node as indicated by the location value of the location tag name.

19. The entry module of claim 18, wherein the program instructions are configured to cause the entry module to associate the location value with the IP packet by generating the packet by encapsulating the IP packet, wherein the packet includes a header comprising the location value.

20. The entry module of claim 18, wherein the packet is the IP packet, wherein the program instructions are configured to cause the entry module to associate the location value with the IP packet by setting the location value as a first option value of the IP packet.

21. The entry module of claim 18, wherein the entry module comprises an Internet Protocol Advertisement Point.

22. A downlink module configured to manage packets in a communication system based on Software Defined Networking, wherein the communication system comprises the downlink module, a radio network node, a mobile device, a forwarding module, a service module, a peer device and a management module for managing the forwarding module and the service module, wherein a data plane of the communication system comprises the downlink module, the forwarding module and the service module and a control plane of the communication system comprises the management module, wherein the mobile device is attached to the radio network node, the downlink module comprising:
 an input/output circuit configured to send and receive packets;
 a processing circuit operatively coupled to the input/output circuit;
 and a memory circuit operatively coupled to the processing circuit and storing program instructions for execution by the processing circuit, the program instructions being configured to cause the downlink module to:
  receive, from the management module, second configuration information indicating a treatment tag name, and treatment values, performed by the forwarding module, of the packets;
  receive, via the entry module, a packet from the peer device;
  select a treatment value out of the treatment values based on information included in the packet, thereby classifying the packet;
  associate the treatment value with the packet, wherein the treatment value is related to the treatment tag name; and
  send the packet and the associated treatment value, via the forwarding module which performs a treatment of the downlink classified packet according to the treatment value, towards the radio network node.

23. The downlink module of claim 22, wherein the program instructions are configured to cause the downlink module to associate the treatment value with the packet by generating a downlink classified packet by encapsulating the IP packet, wherein the downlink classified packet includes a header comprising the treatment value.

24. The downlink module of claim 23, wherein the program instructions are configured to cause the downlink module to associate the treatment value with the packet by associating an identity value of the mobile device with a device tag name by encapsulating the IP packet, wherein the header of the downlink classified packet includes the identity value.

25. The downlink module of claim 22, wherein the packet is an IP packet, wherein the program instructions are configured to cause the downlink module to associate the treatment value with the packet by setting the treatment value as a second option value of the IP packet.

26. A management module configured to manage configuration information in a communication system based on Software Defined Networking, wherein the communication system comprises an entry module, a downlink module, a forwarding module, and an uplink module, wherein a data plane of the communication system comprises the forwarding module and a control plane of the communication system comprises the management module, the management module comprising:
 an input/output circuit configured to send and receive packets;
 a processing circuit operatively coupled to the input/output circuit;
 and a memory circuit operatively coupled to the processing circuit and storing program instructions for execution by the processing circuit, the program instructions being configured to cause the management module to:
  generate first configuration information and/or second configuration information,
  wherein the first configuration information indicates a location tag name and location values, wherein each location value is associated to a respective radio network node to which the mobile device is capable of attaching, and/or
  the second configuration information indicates a treatment tag name and treatment values and a rule for treatment, performed by the forwarding module, of the packets; and
  send the first configuration information to the entry module and/or sending the second configuration information to the downlink module and/or the uplink module.

27. The management module of claim 26, wherein the program instructions are configured to cause the management module to:
 configure the forwarding module with third configuration information without triggering by mobility of the mobile device, wherein the third configuration information specifies to which port a packet, having a location value of the set of location values, is to be forwarded.

28. The management module of claim 26, wherein the rule of the second configuration information specifies how to select a treatment value based on destination IP address and/or source IP address of a packet.

29. An uplink module configured for managing packets in a communication system based on Software Defined Networking, wherein the communication system comprises the uplink module, a radio network node, a mobile device, a forwarding module, a service module, a peer device and a management module for managing the forwarding module and the service module, wherein a data plane of the communication system comprises the downlink module, the forwarding module and the service module and a control plane of the communication system comprises the management module, wherein the mobile device is attached to the radio network node, the uplink module comprising:
 an input/output circuit configured to send and receive packets;
 a processing circuit operatively coupled to the input/output circuit;
 and a memory circuit operatively coupled to the processing circuit and storing program instructions for execution by the processing circuit, the program instructions being configured to cause the uplink module to:
  receive, from the management module, second configuration information indicating a treatment tag name, and treatment values;
  receive, via the radio network node, an IP packet from the mobile device;
  select a treatment value out of the treatment values based on information included in the packet, thereby classifying the IP packet;

generate an uplink classified packet encapsulating the treatment value and the IP packet, wherein the treatment value is related to the treatment tag name; and send the uplink classified packet, via the forwarding module which performs a treatment of the uplink classified packet according to the treatment value, towards the peer device.

30. The uplink module of claim 29, wherein the program instructions are configured to cause the uplink module to generate the uplink classified packet by further encapsulating an identity value of the peer device with an identity tag name into the uplink classified packet.

\* \* \* \* \*

UNITED STATES PATENT AND TRADEMARK OFFICE
CERTIFICATE OF CORRECTION

PATENT NO. : 10,193,798 B2
APPLICATION NO. : 15/542133
DATED : January 29, 2019
INVENTOR(S) : Roeland et al.

It is certified that error appears in the above-identified patent and that said Letters Patent is hereby corrected as shown below:

In the Drawings

In Fig. 15, Sheet 17 of 20, insert Main Designator -- 170 --, therefor.

In Fig. 17, Sheet 18 of 20, insert Main Designator -- 160 --, therefor.

In Fig. 19, Sheet 19 of 20, insert Main Designator -- 147 --, therefor.

In Fig. 21, Sheet 20 of 20, insert Main Designator -- 130 --, therefor.

In the Specification

In Column 1, Line 58, delete "Home Subscription System" and insert -- Home Subscription Service --, therefor.

In Column 2, Lines 63-64, delete "first Forwarding Element (FE1) 202" and insert -- first Forwarding Element (FE1) 206 --, therefor.

In Column 2, Line 64, delete "FE 2 207" and insert -- FE2 207 --, therefor.

In Column 3, Line 1, delete "(ftp://ftp.cs.princeton.edu/techreports 2013/950." and insert -- (ftp://ftp.cs.princeton.edu/techreports/2013/950.pdf) --, therefor.

In Column 3, Line 6, delete "AS4 324" and insert -- AS4 323 --, therefor.

In Column 3, Lines 11-12, delete "FE 1 340 and FE3 2" and insert -- FE1 340 and FE3 342 --, therefor.

In Column 3, Line 27, delete "FE 345" and insert -- FE6 345 --, therefor.

Signed and Sealed this
Eighth Day of October, 2019

Andrei Iancu
*Director of the United States Patent and Trademark Office*

CERTIFICATE OF CORRECTION (continued)
U.S. Pat. No. 10,193,798 B2

In Column 3, Line 52, delete "AS 2 321." and insert -- AS2 321. --, therefor.

In Column 14, Line 48, delete "an device" and insert -- a device --, therefor.

In Column 18, Line 22, delete "(https://tools.jetf.org/html/draft-gross-geneve-02)." and insert -- (https://tools.ietf.org/html/draft-gross-geneve-02). --, therefor.

In Column 19, Line 55, delete "FIGS. 13aand 13b" and insert -- FIGS. 13a and 13b --, therefor.

In Column 30, Line 65, delete "http://mcs-generatorsourceforge.net/" and insert -- http://mcs-generator.sourceforge.net/ --, therefor.